United States Patent
Buzsaki et al.

(10) Patent No.: US 10,496,399 B2
(45) Date of Patent: Dec. 3, 2019

(54) USING A DATA DICTIONARY TO DETERMINE AN UPGRADE EDITION OF A RELATIONAL DATABASE TABLE

(71) Applicant: Oracle International Corporation, Redwood Shores, CA (US)

(72) Inventors: George Buzsaki, Fremont, CA (US); Mark Warren, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 205 days.

(21) Appl. No.: 13/802,771

(22) Filed: Mar. 14, 2013

(65) Prior Publication Data

US 2014/0101644 A1    Apr. 10, 2014

Related U.S. Application Data

(60) Provisional application No. 61/707,823, filed on Sep. 28, 2012, provisional application No. 61/707,827, (Continued)

(51) Int. Cl.
*G06F 8/656* (2018.01)
*G06F 8/65* (2018.01)
(Continued)

(52) U.S. Cl.
CPC ............... *G06F 8/656* (2018.02); *G06F 8/65* (2013.01); *G06F 8/658* (2018.02); *G06F 8/71* (2013.01);
(Continued)

(58) Field of Classification Search
CPC ...... G06F 8/65; G06F 9/542; G06F 17/30339; G06F 17/30463; G06F 11/1469; G06F 17/30286; G06Q 10/06
(Continued)

(56) References Cited

U.S. PATENT DOCUMENTS 5,227,967 A    7/1993    Bailey
5,315,709 A    5/1994    Alston et al.
(Continued)

OTHER PUBLICATIONS

Choi, Alan. "Online application upgrade using edition-based redefinition." 2009. Proceedings of the 2nd International Workshop on Hot Topics in Software Upgrades. ACM.*
(Continued)

*Primary Examiner* — Lewis A Bullock, Jr.
*Assistant Examiner* — Gilles R Kepnang
(74) *Attorney, Agent, or Firm* — Vista IP Law Group, LLP

(57) ABSTRACT

A method, system, and computer program product using a data dictionary to automatically determine an upgrade edition of relational database table in a database installation. The editioning method commences upon receiving a data dictionary of the database comprising at least entries corresponding to a first edition of the relational database table, then reading entries of the data dictionary to identify at least one relational database table column of the relational database table that has a revision identifier. The revision identifiers are used to determine a first edition (e.g., a run edition) and a second edition (e.g., an upgrade edition). Then, the method proceeds by creating at least a first relational database table view corresponding to the first edition of the relational database table; and creating at least a second relational database table view corresponding to the upgrade edition of the relational database table using the identified relational database table column.

23 Claims, 9 Drawing Sheets

Related U.S. Application Data filed on Sep. 28, 2012, provisional application No. 61/707,840, filed on Sep. 28, 2012.

(51) Int. Cl.
| | | |
|---|---|---|
| *G06F 8/71* | (2018.01) | |
| *G06F 16/23* | (2019.01) | |
| *G06F 16/28* | (2019.01) | |
| *G06F 8/658* | (2018.01) | |
| *G06F 11/20* | (2006.01) | |
| *G06F 16/178* | (2019.01) | |
| *G06F 16/245* | (2019.01) | |

(52) U.S. Cl.
CPC ...... *G06F 11/2056* (2013.01); *G06F 11/2058* (2013.01); *G06F 16/178* (2019.01); *G06F 16/23* (2019.01); *G06F 16/2358* (2019.01); *G06F 16/2365* (2019.01); *G06F 16/2372* (2019.01); *G06F 16/2393* (2019.01); *G06F 16/245* (2019.01); *G06F 16/284* (2019.01)

(58) Field of Classification Search
USPC .......... 707/101, 203, 695; 709/219; 717/170
See application file for complete search history.

(56) References Cited

U.S. PATENT DOCUMENTS

| | | |
|---|---|---|
| 5,440,743 A | 8/1995 | Yokota et al. |
| 5,448,727 A | 9/1995 | Annevelink |
| 5,555,388 A | 9/1996 | Shaughnessy |
| 5,608,903 A | 3/1997 | Prasad et al. |
| 5,640,550 A | 6/1997 | Coker |
| 5,675,785 A | 10/1997 | Hall |
| 5,717,924 A | 2/1998 | Kawai |
| 5,978,426 A | 11/1999 | Glover et al. |
| 6,016,497 A | 1/2000 | Suver |
| 6,122,630 A | 9/2000 | Strickler et al. |
| 6,122,640 A | 9/2000 | Pereira |
| 6,138,112 A | 10/2000 | Slutz |
| 6,173,313 B1 | 1/2001 | Klots et al. |
| 6,268,850 B1 | 7/2001 | Ng |
| 6,304,867 B1 | 10/2001 | Schmidt |
| 6,314,535 B1 | 11/2001 | Bair et al. |
| 6,324,535 B1 | 11/2001 | Bair et al. |
| 6,363,387 B1 | 3/2002 | Ponnekanti et al. |
| 6,460,055 B1 | 10/2002 | Midgley et al. |
| 6,480,848 B1 | 11/2002 | DeKimpe et al. |
| 6,519,613 B1 | 2/2003 | Friske et al. |
| 6,598,059 B1 | 7/2003 | Vasudevan et al. |
| 6,611,848 B1 | 8/2003 | Bradley |
| 6,633,870 B1 | 10/2003 | Bradley |
| 6,633,883 B2 | 10/2003 | Koskas |
| 6,681,225 B1 | 1/2004 | Uceda-Sosa et al. |
| 6,745,209 B2 | 6/2004 | Holenstein et al. |
| 6,769,124 B1 | 7/2004 | Schoening et al. |
| 6,801,983 B2 | 10/2004 | Abe et al. |
| 6,834,290 B1 | 12/2004 | Pugh et al. |
| 6,965,899 B1* | 11/2005 | Subramaniam ... G06F 17/30339 |
| 7,028,057 B1* | 4/2006 | Vasudevan et al. .......... 707/695 |
| 7,080,371 B1* | 7/2006 | Arnaiz et al. ................ 717/170 |
| 7,237,238 B2 | 6/2007 | Peppers |
| 7,310,653 B2* | 12/2007 | Coyle et al. |
| 7,350,191 B1* | 3/2008 | Kompella ................ G06F 8/61 |
| | | 707/999.005 |
| 7,421,458 B1 | 9/2008 | Taylor et al. |
| 7,574,461 B1 | 8/2009 | Armorer et al. |
| 7,603,669 B2 | 10/2009 | Curtis et al. |
| 7,689,587 B1 | 3/2010 | Tiruveedi et al. |
| 7,693,889 B1 | 4/2010 | Armorer et al. |
| 8,087,013 B2 | 12/2011 | Kelly et al. |
| 8,495,612 B2 | 7/2013 | Bertrand |
| 8,635,189 B1* | 1/2014 | Tenzer ................ G06F 11/1469 |
| | | 707/639 |
| 8,793,230 B2* | 7/2014 | Engelko et al. .............. 707/695 |
| 9,043,778 B2 | 5/2015 | Lin et al. |
| 2002/0019972 A1 | 2/2002 | Grier et al. |
| 2002/0059280 A1* | 5/2002 | Slesinsky .............. G06F 16/284 |
| 2002/0087271 A1 | 7/2002 | Rozenshtein et al. |
| 2002/0087962 A1* | 7/2002 | Hudson ..................... G06F 8/71 |
| | | 717/172 |
| 2002/0188600 A1 | 12/2002 | Lindsay et al. |
| 2003/0041127 A1 | 2/2003 | Turnbull |
| 2003/0130985 A1* | 7/2003 | Driesen ............ G06F 17/30286 |
| 2003/0154216 A1 | 8/2003 | Arnold et al. |
| 2003/0217069 A1 | 11/2003 | Fagin et al. |
| 2003/0229610 A1 | 12/2003 | Van Treeck |
| 2004/0002972 A1* | 1/2004 | Pather ..................... G06F 9/542 |
| 2004/0064487 A1 | 4/2004 | Nguyen et al. |
| 2005/0015376 A1 | 1/2005 | Fraser et al. |
| 2005/0102660 A1 | 5/2005 | Chen |
| 2005/0108733 A1 | 5/2005 | Bermudez et al. |
| 2005/0149475 A1 | 7/2005 | Chkodrov et al. |
| 2005/0149920 A1 | 7/2005 | Patrizi et al. |
| 2005/0154695 A1 | 7/2005 | Gonzalez et al. |
| 2005/0251523 A1* | 11/2005 | Rajamani .......... G06F 17/30345 |
| 2006/0015528 A1 | 1/2006 | Hejlsberg et al. |
| 2006/0070088 A1* | 3/2006 | Wason ................ G06F 9/44505 |
| | | 719/320 |
| 2006/0085457 A1 | 4/2006 | Gelfand |
| 2006/0085465 A1* | 4/2006 | Nori .................. G06F 17/30297 |
| 2006/0117029 A1* | 6/2006 | Yingst ............... G06F 17/30365 |
| 2006/0130040 A1 | 6/2006 | Subramanian et al. |
| 2006/0242381 A1 | 10/2006 | Shatskih et al. |
| 2007/0038590 A1 | 2/2007 | Vijayan et al. |
| 2007/0038651 A1 | 2/2007 | Bernstein et al. |
| 2007/0061487 A1* | 3/2007 | Moore ............. G06F 17/30575 |
| | | 709/246 |
| 2007/0079140 A1 | 4/2007 | Metzger et al. |
| 2007/0106701 A1 | 5/2007 | Periyasamy |
| 2007/0156849 A1* | 7/2007 | Becker .......................... 709/219 |
| 2007/0219951 A1 | 9/2007 | Ahmed et al. |
| 2008/0098046 A1* | 4/2008 | Alpern et al. ................ 707/203 |
| 2008/0201701 A1* | 8/2008 | Hofhansl et al. ............. 717/168 |
| 2008/0243966 A1* | 10/2008 | Croisettier ........ G06F 17/30315 |
| 2008/0250057 A1* | 10/2008 | Rothstein .......... G06F 17/30286 |
| 2009/0006884 A1* | 1/2009 | Cahill .................... H04L 12/403 |
| | | 714/4.1 |
| 2009/0198709 A1* | 8/2009 | Mishra ................ G06F 16/258 |
| 2009/0307650 A1 | 12/2009 | Saraf |
| 2010/0110474 A1 | 5/2010 | Coulter et al. |
| 2010/0281458 A1* | 11/2010 | Paladino ................... G06F 8/71 |
| | | 717/106 |
| 2010/0318494 A1* | 12/2010 | Val ..................... G06F 17/30297 |
| | | 707/609 |
| 2011/0202911 A1* | 8/2011 | Brooks ....................... G06F 8/60 |
| | | 717/174 |
| 2012/0036165 A1* | 2/2012 | Driesen ............ G06F 17/30286 |
| | | 707/803 |
| 2012/0036166 A1* | 2/2012 | Qiu ........................ G06F 16/27 |
| | | 707/803 |
| 2012/0041933 A1* | 2/2012 | Driesen ................ G06F 16/214 |
| | | 707/702 |
| 2012/0041988 A1* | 2/2012 | Driesen ............ G06F 17/30297 |
| | | 707/803 |
| 2012/0047185 A1* | 2/2012 | Driesen ..................... G06F 8/60 |
| | | 707/803 |
| 2012/0095950 A1* | 4/2012 | Ziegler .................. G06Q 10/06 |
| | | 706/47 |
| 2012/0222025 A1 | 8/2012 | Pandit |
| 2012/0239707 A1* | 9/2012 | Figus ................ G06F 17/30595 |
| | | 707/803 |
| 2012/0296883 A1* | 11/2012 | Ganesh ............ G06F 17/30315 |
| | | 707/693 |
| 2012/0297030 A1* | 11/2012 | Knobel ..................... G06F 8/65 |
| | | 709/219 |
| 2012/0310921 A1* | 12/2012 | Egan ................ G06F 17/30463 |
| | | 707/718 |
| 2013/0086015 A1* | 4/2013 | van Rotterdam .......................... G06F 17/30309 |
| | | 707/695 |

(56) References Cited

U.S. PATENT DOCUMENTS

| | | |
|---|---|---|
| 2013/0104115 A1 | 4/2013 | Bertrand |
| 2013/0132936 A1 | 5/2013 | Wang |
| 2014/0282473 A1 | 9/2014 | Saraf |
| 2014/0344798 A1 | 11/2014 | Sasaki |

OTHER PUBLICATIONS

Dumitras, Tudor et al. "Second ACM workshop on hot topics in software upgrades (HotSWUp 2009)." 2009. OOPSLA Companion.*

Notice of Allowance and Fees Due dated Oct. 21, 2015 for related U.S. Appl. No. 13/802,785.

Notice of Allowance and Fees Due dated Nov. 25, 2015 for related U.S. Appl. No. 13/802,774.

Non-final Office Action dated Dec. 2, 2015 for related U.S. Appl. No. 13/802,791.

Notice of Allowance and Fee(s) Due dated Jan. 6, 2016 for related U.S. Appl. No. 13/802,794, 6 pages.

Notice of Allowance and Fee(s) due dated Apr. 11, 2016 for related U.S. Appl. No. 13/802,791.

Notice of Allowance and Fee(s) Due dated Jan. 27, 2017 for related U.S. Appl. No. 14/823,849.

Non-final Office Action dated Aug. 11, 2017 for related U.S. Appl. No. 15/236,923.

Non-final Office Action dated Oct. 3, 2017 for related U.S. Appl. No. 15/149,489.

Notice of Allowance and Fee(s) due dated Feb. 9, 2018 for related U.S. Appl. No. 15/149,489.

Notice of Allowance and Fee(s) due dated Feb. 27, 2018 for related U.S. Appl. No. 15/236,923.

"Oracle OLAP", Oracle, Jan. 3, 2012, 2 pages url: http://www.oracle.com/technetwork/database/options/olap/index.html.

"Introduction to Analytic Workspaces", Oracle OLAP DML Reference, 11g Release 1 (11.1), Part No. B28126-03, Oracle, Mar. 18, 2013, 2 pages url: http://docs.oracle.com/cd/B28359_01/olap.111/b28126/dml_basics004.htm.

Non-final Office Action dated Feb. 12, 2015 for U.S. Appl. No. 13/802,774.

Non-final Office Action dated Feb. 12, 2015 for U.S. Appl. No. 13/802,791.

Non-final Office Action dated May 21, 2015 for U.S. Appl. No. 13/802,794.

Final Office Action dated Jun. 1, 2015 for U.S. Appl. No. 13/802,785.

Final Office Action dated Jul. 8, 2015 for U.S. Appl. No. 13/802,774.

Final Office Action dated Jul. 14, 2015 for U.S. Appl. No. 13/802,791.

Notice of Allowance dated May 11, 2015 for U.S. Appl. No. 13/802,780.

Lassen et al. Experiences with object oriented development in PL!SQL, Center for Object Technology COT/4-18-V1.4, 2000.

Object Cache Navigation, Oracle Call Interface PRogrammer's Guide, Release 2 (9.2), Part No. A96584-10, 1996,2002.

Date et al, A Guide to SQL/DS, 1989, Addison-Wesley, Chapter 10.

Quest Software, Inc., LiveReorg.RTM., "Reorganization for the 24.times.7, Database," 2001.

Paapanen, Eric et al., "Oracle Database Application Developer's Guide—Large Objects", 10g Release 1 (10.1), Part No. B1079601, Apr. 21, 2008, 668 pages.

Smith, Jeff, "The Shortest, Fastest, and Easiest way to compare two tables in SQL Server: Union!", Jeffs SQL Server Blog 10, Apr. 22, 2008, 45 pages.

T-SQL, "sp_rename (T-SQL)", printed Apr. 22, 2008, 3 pages.

Non-final Office Action dated Mar. 8, 2010 for U.S. Appl. No. 11/875,478.

Advisory Action dated Jan. 26, 2010 for U.S. Appl. No. 11/444,571.

Davidson, Tom, "Managing Schema Changes (Part 2)," MSSQL Server Development Customer Advisory Team, Mar. 31, 2006, Microsoft Cororation. Nov. 19, 2000 <http://blogs.msdn.com/sqlcat/archive/2006/O3/31/566046.aspx>.

Ambler, Scott, and Pramod Sadalage. Refactoring Databases: Evolutionary Database Design. Mar. 3, 2006.

Final Office Action dated Aug. 30, 2010 for U.S. Appl. No. 11/875,478.

Notice of Allowance dated Mar. 21, 2011 for U.S. Appl. No. 11/444,571.

Final Office Action dated Dec. 7, 2010 for U.S. Appl. No. 11/201,797.

Final Office Action dated Sep. 8, 2011 for U.S. Appl. No. 11/801,495.

Scott Ambler et al., "Refactoring Databases: Evolutionary Database Design", Mar. 3, 2006, 7 pages.

Tom Davidson, Managing Schema Changes (Part 2), MSSQL Server Development Customer Advisory Teach, Mar. 31, 2006, Microsoft Corporation, Nov. 19, 2000, http://blgs.msdn.com/squlcat/archive/2006/03/31/566046.aspx, 11 pages.

Non-final Office Action dated Jan. 31, 2012 for U.S. Appl. No. 11/875,478.

Final Office Action dated Jan. 25, 2012 for U.S. Appl. No. 11/201,797.

Non-final Office Action dated Jun. 27, 2012 for U.S. Appl. No. 11/875,478.

Final Office Action dated Jan. 29, 2013 for U.S. Appl. No. 11/875,478.

Advisory Action dated Mar. 8, 2013 for U.S. Appl. No. 11/875,478.

Final Office Action dated Mar. 29, 2013 for U.S. Appl. No. 11/801,495.

Notice of Allowance dated Jun. 12, 2013 for U.S. Appl. No. 11/875,478.

Notice of Allowance dated Jan. 16, 2015 for U.S. Appl. No. 13/802,780.

Non-final Office Action dated Nov. 20, 2014 for U.S. Appl. No. 13/802,785.

Non-final Office Action dated Jul. 31, 2014 for U.S. Appl. No. 13/802,794.

Final Office Action dated Jan. 16, 2015 for U.S. Appl. No. 13/802,794.

Non-final Office Action dated Aug. 15, 2016 for related U.S. Appl. No. 14/823,849.

* cited by examiner

USING A DATA DICTIONARY TO DETERMINE AN UPGRADE EDITION OF A RELATIONAL DATABASE TABLE

RELATED APPLICATIONS

The present application claims the benefit of priority to U.S. Provisional Patent Application Ser. No. 61/707,823, entitled "ONLINE PATCHING ORCHESTRATION", filed on Sep. 28, 2012, and U.S. Provisional Patent Application Ser. No. 61/707,827, entitled "CONFIGURATION CHANGE DETECTION AND PROPAGATION", filed on Sep. 28, 2012, and U.S. Provisional Patent Application Ser. No. 61/707,840, entitled "SYNCHRONIZING DOMAIN CONFIGURATION PARAMETERS", filed on Sep. 28, 2012, which are all hereby incorporated by reference in their entireties; and the present application is related to co-pending U.S. patent application Ser. No. 13/802,780, entitled "TRANSPARENTLY UPGRADING DERIVED DATABASE OBJECTS", filed on Mar. 14, 2013, which is hereby incorporated by reference in its entirety; and the present application is related to co-pending U.S. patent application Ser. No. 13/802,785, entitled "USING CONFIDENCE VALUES FOR SYNCHRONIZING FILE SYSTEM", filed on Mar. 14, 2013, which is hereby incorporated by reference in its entirety; and the present application is related to co-pending U.S. patent application Ser. No. 13/802,791, entitled "REDUCING DOWNTIME DURING UPGRADES OF INTERRELATED COMPONENTS IN A DATABASE SYSTEM", filed on Mar. 14, 2013, which is hereby incorporated by reference in its entirety; and the present application is related to co-pending U.S. patent application Ser. No. 13/802,794, entitled "SYNCHRONIZATION OF CONFIGURATION CHANGES BETWEEN APPLICATIONS AND THEIR PLATFORMS", filed Mar. 14, 2013, which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosure relates to the field of performing periodic upgrades of a system of applications in a relational database environment and more particularly to techniques for using a data dictionary to automatically determine an upgrade edition of a relational database table.

BACKGROUND

Reducing downtime of computing systems while upgrading is a goal that has been long sought after. Legacy approaches have addressed the problem by deploying techniques to upgrade one or another type of data found in an installation of a computing system, while relying on other techniques to upgrade other types of data found in the same installation. For example, legacy techniques have addressed the task of upgrading a set of software applications that rely on an underlying relational database by shutting down the relational database for a duration, then upgrading the software applications as well as upgrading the relational database structures, and then restarting the relational database.

Strictly as an example of the deficiencies of the aforementioned legacy techniques, an upgraded application might include certain assumptions of an underlying file system (e.g., either format or content), and those assumptions might not become true until a certain time after the software application as well as the file system have both been successfully upgraded. However, in modern environments, the corpus of software application code modules, plus the relational database storage, can comprise a very large storage footprint, which presents a practical constraint to the use of the legacy techniques in that the legacy techniques bring the system down for system-wide upgrades, thus incurring long downtimes during upgrades. Automation is needed. That is, in modern environments, the number of software application code modules to be upgraded, plus the number of relational database storage objects (e.g., tables) to be upgraded becomes large, and the aforementioned technologies fail to address the problem in a manner that can automatically determine an upgrade edition of a relational database object. Therefore, there is a need for an improved approach.

SUMMARY

The present disclosure provides an improved method, system, and computer program product suited to address the aforementioned issues with legacy approaches. More specifically, the present disclosure provides a detailed description of techniques used in methods, systems, and computer program products for using a data dictionary to automatically determine an upgrade edition of a relational database table.

Disclosed herein are a system and computer implemented method for using a data dictionary to automatically determine an upgrade edition of relational database table in a database installation. The editioning method commences upon receiving a data dictionary of the database comprising at least entries corresponding to a first edition of the relational database table, then reading entries of the data dictionary to identify at least one relational database table column of the relational database table that has a revision identifier. The revision identifiers are used to determine a first edition (e.g., a run edition) and a second edition (e.g., an upgrade edition). Then, the method proceeds by creating at least a first relational database table view corresponding to the first edition of the relational database table using the identified relational database table column; and creating at least one second relational database table view corresponding to the upgrade edition of the relational database table using the identified relational database table column. Software applications can then be configured using synonyms to access either the first edition or the second edition. Both editions can coexist in the database, and any one or more applications from among a set of software applications to be upgraded, can access the first relational database table view using the first configuration, and can access the second relational database table view using the second configuration.

A cleanup phase serves to remove constraints on columns that appeared in a first view that do not appear in the second view. Unused storage space is deallocated.

Further details of aspects, objectives, and advantages of the disclosure are described below in the detailed description, drawings, and claims. Both the foregoing general description of the background and the following detailed description are exemplary and explanatory, and are not intended to be limiting as to the scope of the claims.

DETAILED DESCRIPTION

Figure 1A:
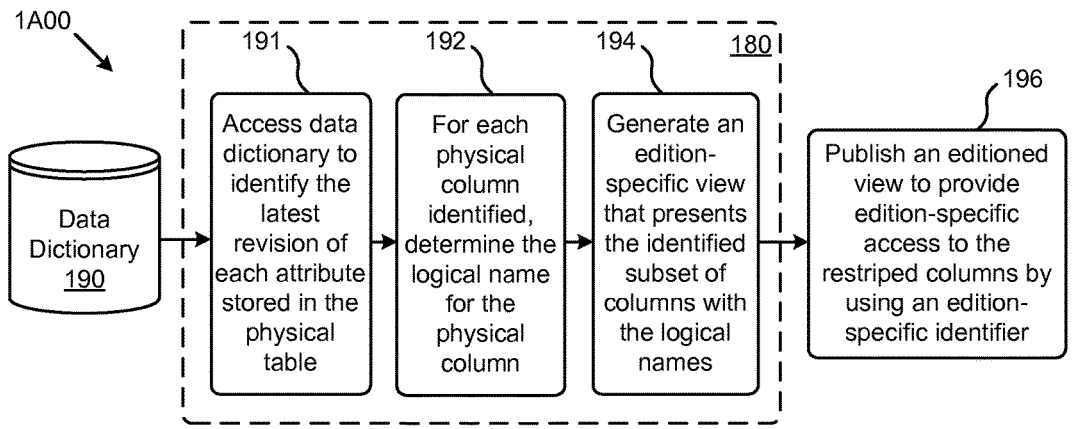
FIG. 1A is a flow for generating an editioned view in a system for using a data dictionary to automatically determine an upgrade edition of a relational database table, according to some embodiments.

Some embodiments of the present disclosure are directed to an improved approach for using a data dictionary to automatically determine an "upgrade edition" of a relational database table. More particularly, disclosed herein and in the accompanying figures are exemplary environments, methods, and systems for using a data dictionary to automatically determine an upgrade edition of a relational database table.

Overview

Modern application systems comprise several different domains of objects, namely software applications, file systems (which may include executable files or other files comprising software code modules for the software applications), and relational database subsystems comprising tables and other data structures used by the software applications. Developers of the software applications may be presented with a requirement that results in a change to an underlying table. Accordingly the software application as well as the table or tables that are accessed by the software application need to be in sync for the intended operation.

Strictly as an example, a developer of an "upgraded software application" may wish to alter the schema of a table. For example, the developer might wish to change the formatting of data in a particular column. Using an editioned table, the developer can add a new column (an editioned column) that is designated to contain the changed formatting. The developer can then modify the upgrade version of the software application to be able to use the upgraded formatting when the edition becomes active during an upgrade cycle (e.g., using the edition identifier to distinguish the older edition from the newer edition). This can be implemented by using the techniques disclosed herein.

Developer-managed tables can be accessed through an editioning view (EV). The editioning view maps logical column names (e.g., column names as used by application code) to the physical table columns that store the data. If a database table is to be upgraded or patched in a manner that is incompatible with the running application, then the herein-disclosed techniques serve to store the upgrades or patched data in new columns and also to change the editioning view to reference the new columns in an "upgrade edition" (e.g., a patch edition). Further, aspects of the data transformations are coded as "cross-edition triggers". Cross-edition triggers serve to automatically capture and apply changes detected in one edition (e.g., a run edition) to an upgraded edition (e.g., a patch edition). Multiple versions of the applications (e.g., an old version and an upgraded version) can run concurrently.

As aforementioned, the legacy approaches suffer from deficiencies that are addressed in the present disclosure. Following the techniques described herein, both the "pre-upgrade software application" as well as the "upgraded software application" can be running concurrently, and can access and operate on the same editioned tables (e.g., using an edition identifier to distinguish an older edition from a newer edition). Such concurrent access and operations on tables, and the ability to detect changes made to an older edition in order to apply them to a newer edition serve to facilitate a very short cutover period when upgrading an application system.

Figure 1B:
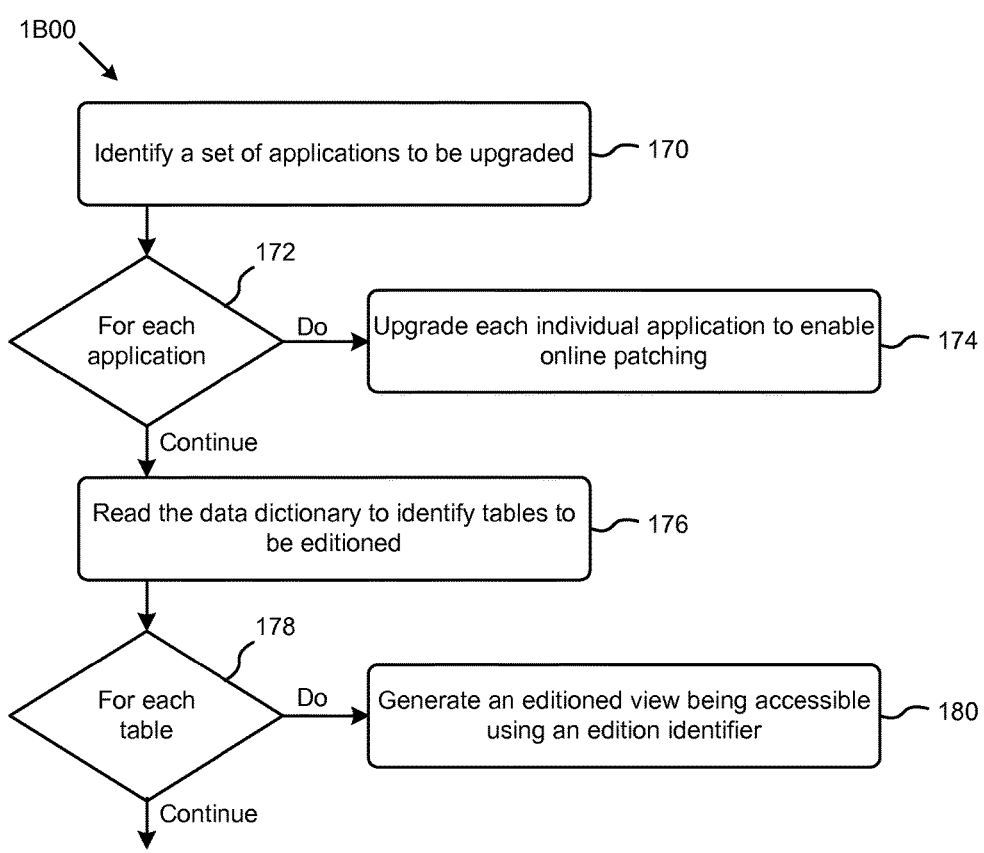
FIG. 1B shows a procedure for generating an editioned view in a system for using a data dictionary to automatically determine an upgrade edition of a relational database table, according to some embodiments.

The discussion of FIG. 1A introduces a flow for automatically generating an editioned view in a system using a data dictionary, and FIG. 1B introduces one of several techniques for upgrading a set of individual software applications within an application system where each individual application potentially accesses a plurality of tables to be upgraded.

Further details regarding a general approach to implementing an editioned view and for using an editioned view are described in U.S. Publication No. 2008/0098046, entitled "LOW-DOWNTIME AND ZERO-DOWNTIME UPGRADES OF DATABASE-CENTRIC APPLICATIONS" which is hereby incorporated by reference in entirety.

Definitions

Some of the terms used in this description are defined below for easy reference. The presented terms and their respective definitions are not rigidly restricted to these definitions—a term may be further defined by the term's use within this disclosure.

The term "editioned table" or "editioned tables" refers to physical tables that provide storage for multiple editions of an application entity. Each edition of the application must include an editioning view identifier that provides a selection of relevant storage columns for that edition, and maps the physical column names to logical names expected by the application code.

The term "cross-edition trigger" refers to an operation where a change to an editioned table is detected as pertaining to a table in a first edition, and the change is propagated to a second edition of the same table.

The term "pre-upgrade software application" refers to a version of a software application code prior to being upgraded (e.g., via a patch, or version-up replacement).

The term "upgraded software application" refers to a version of a software application code after being upgraded (e.g., via a patch, or version-up replacement).

The term "data dictionary" refers to a group of data structures comprising entries that codify the data representation of the physical tables within a relational database system.

A "run edition" refers to a to-be-upgraded database edition used by the running application.

A "patch edition" refers to a database edition upon which patching actions execute.

An "old edition" refers to any ancestor of a run edition.

The term "logic" means any combination of software or hardware that is used to implement all or part of the embodiments of the present disclosure.

A "module" includes any mix of any portions of computer memory and any extent of circuitry including hard-wired logic or circuitry embodied as a processor.

The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances.

The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A is a flow 1A00 for generating an editioned view in a system for using a data dictionary to automatically determine an upgrade edition of a relational database table. As an option, the flow may be implemented in the context of the architecture and functionality of the embodiments described herein. Also, the flow 1A00 or any aspect therein may be implemented in any desired environment.

As previously introduced, one approach to online patching is to create a copy of the upgraded (and other) components, the set of which is termed the "patch edition", and then execute patch actions against the patch edition. After patch actions are complete, the patch edition is configured to become the new edition, and any stopped applications are restarted. In some embodiments the aforementioned functions can be amalgamated into a module (e.g., an edition manager), which module becomes responsible for preparing, enabling, and cleaning up application editions.

As shown in FIG. 1A, a data dictionary 190 is accessed in order to identify the latest revision of each attribute stored in the physical table (see operation 191) and then, for each physical column identified in operation 191, determine the logical name for the physical column (see operation 192), then generate an edition-specific view that presents the identified subset of columns with the logical names (see operation 194). Such operations can be performed repeatedly in a loop (see subroutine 180) so as to perform the operations on all attributes in a relational database table that are to become editioned. The editioned view can be published to provide edition-specific access to the restriped columns using an edition-specific identifier (see operation 196).

FIG. 1B shows a procedure 1B00 for generating an editioned view in a system for using a data dictionary to automatically determine an upgrade edition of a relational database table. As an option, the present procedure 1B00 may be implemented in the context of the architecture and functionality of the embodiments described herein. Also, the procedure 1B00 or any aspect therein may be implemented in any desired environment.

Following the techniques of flow 1A00, a single relational table can be editioned. However, in exemplary embodiments, there may be multiple relational tables to be editioned, and there may be multiple applications that access a given editioned relational table. Accordingly, a procedure 1B00 can execute loops so as to coordinate upgrade actions performed on an application system (e.g., preparing, enabling, and cleaning up edition components).

As shown, procedure 1B00 commences by identifying a set of applications to be upgraded (see operation 170). Such an upgrade operation on each identified application (see operation 174) can be performed whether or not the application accesses any of the multiple relational tables to be editioned. The procedure 1B00 loops through the set of applications (see iterator 172), and an operation 174 serves to enforce a coding standard on each application such that the application developer need not be aware of the specific edition that is deemed to be the then current edition. Such a generalized technique is further described in U.S. Publication No. 2008/0098046, entitled "LOW-DOWNTIME AND ZERO-DOWNTIME UPGRADES OF DATABASE-CENTRIC APPLICATIONS".

The procedure 1B00 continues by accessing the data dictionary to identify the set of tables to be editioned (see operation 176). Once the set of tables to be editioned has been identified, the procedure iterates (see iterator 178) so as to generate an editioned view (e.g., using a column stripe) for each table and each affected column in each identified table (see subroutine 180).

Figure 1C:
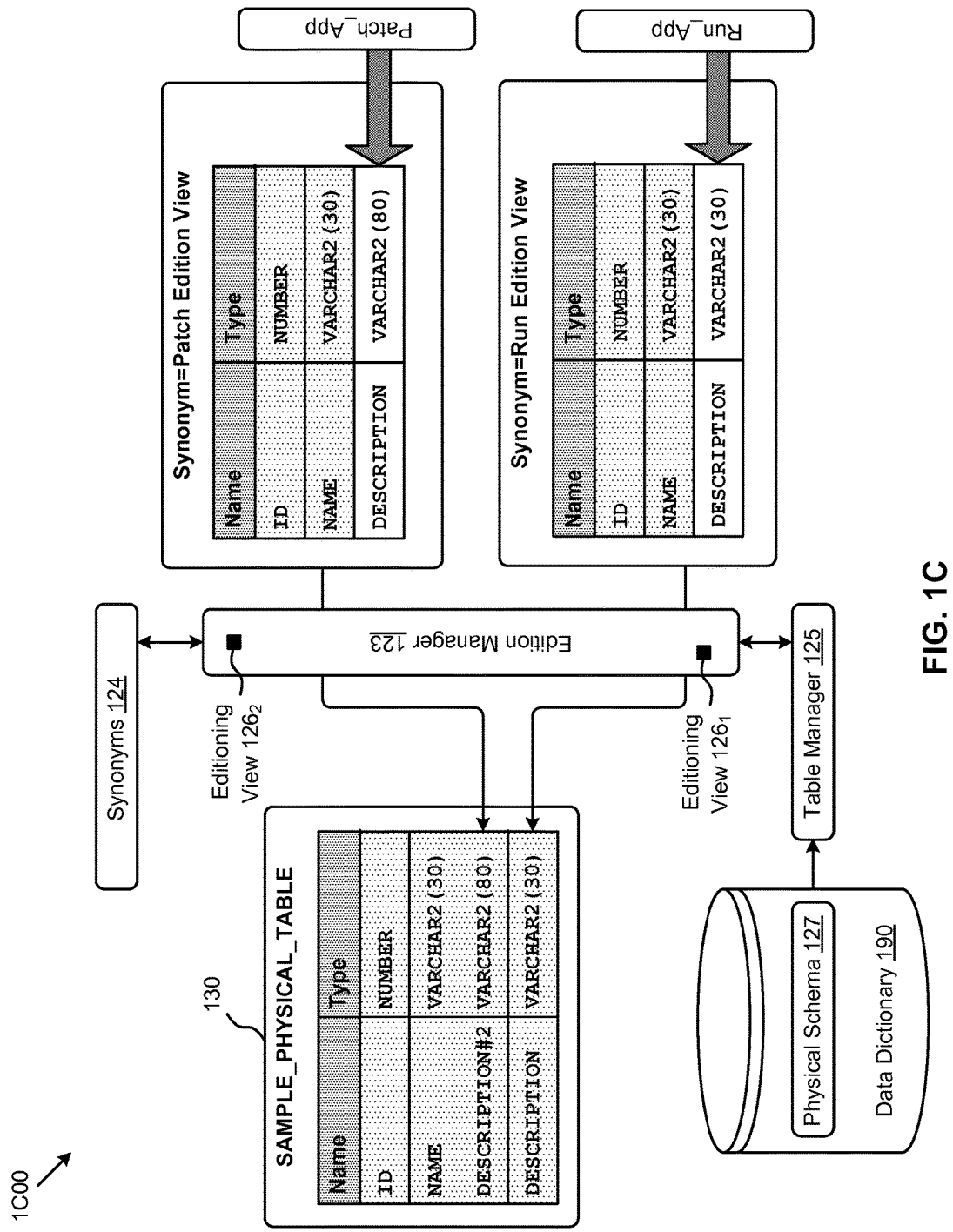
FIG. 1C is a schematic showing access to a physical table through an edition manager in a system using a data dictionary to automatically determine an upgrade edition of a relational database table, according to some embodiments.

FIG. 1C is a schematic 1C00 showing access to a physical table through an edition manager in a system using a data dictionary to automatically determine an upgrade edition of a relational database table. As an option, the present schematic 1C00 may be implemented in the context of the architecture and functionality of the embodiments described herein. Also, the schematic 1C00 or any aspect therein may be implemented in any desired environment.

As earlier indicated, and in order to isolate patch changes from the 'old' running applications, online patching of applications and database objects can execute in a separate database edition. An edition manager implements the logic required to create new editions, cutover to new editions, and cleanup old editions. There are three monikers for editions as are referred to herein:

- A "run edition". As used in the embodiment of FIG. 1C, this is the default database edition (e.g., the edition of the database connected to by default when connecting to the database).
- A "patch edition". As used in the embodiment of FIG. 1C, this is the database edition where patching actions execute.
- An "old edition". As used in the embodiment of FIG. 1C, this is the database that is an ancestor of the run edition.

Database editions names are unique with respect to one another. Any form of an edition name can be automatically generated.

In exemplary embodiments, an editioning view is automatically maintained for each developer-managed table found in the physical schema 127. A developer-managed table as used herein has the following properties:

- A developer-managed table is defined in the physical schema.
- A developer-managed table has a synonym capable of pointing to it.
- A developer-managed table can be managed by a table manager 125 and or an edition manager 123 during a patching cycle.

Further, a developer-managed table (e.g., SAMPLE_PHYSICAL_TABLE 130) as used in the embodiment of FIG. 1C has the following properties:

- A developer-managed table is not a hidden/internal table generated by the database (e.g., XML schemas, materialized view containers, etc.).
- A developer-managed table is not a temporary table—it has permanent data that may need to be upgraded during online patching.

As shown, developer-managed tables can be accessed by software applications (e.g., Run_App, Patch_App, etc.) through an editioning view. The software applications are unaware of which edition of the SAMPLE_PHYSICAL_TABLE is being accessed. The edition manager 123 uses one or more synonyms 124 to refer to an editioning view, and the editioning view in turn maps logical column names (e.g., as used by application code) to the physical column names of the table that actually store the data onto physical media. In the context of a system to automatically determine an upgrade edition of a relational database table, the table manager 125 reads entries in a data dictionary (e.g., see physical schema 127) to determine if a database table has been patched in a way that is incompatible with the running application. If so, then updates are stored in newly-created columns (e.g., in a patch edition), and the editioning view is updated to reference the newly-created columns in the patch edition. Characteristics of the newly-created columns, including any data transformations, are coded as cross-edition triggers. Changes to the run edition are detected by the cross-edition triggers and are automatically applied to the patch edition.

Example Upgrade

If a table structure or data is intended to be upgraded in a way that is incompatible with the running application, then the change is implemented using one or more new table columns and a cross-edition trigger. The trigger has the property of executing in the patch edition even though it had been triggered from within the run edition. Using newly-created columns and cross-edition triggers, an application system can be upgraded (e.g., by upgrading data in the patch edition) while applications in the application system continue to operate in the run edition. The technique is exemplified as follows:

- Create new base columns or revise existing columns to hold patched data. The editioning view of the run edition prevents the new columns (e.g., in the patch edition) from being accessible by the running application in the run edition.
- The table manager can regenerate the editioning view in the patch edition so that it picks up the new columns. As such, the new columns become visible to the patch edition of the application (although in some time periods the new columns are empty of data).
- Install a cross-edition trigger. A cross-edition trigger can serve to populate the new columns. For example, a cross-edition trigger can take input from the run edition columns (and any other data source), compute the new values, and store the results in the new columns of the patch edition. In exemplary cases, a cross-edition trigger is initially created as being "disabled" so that it can be installed and validated without affecting the running application(s).
- Apply the cross-edition trigger to the table. At this point, the trigger is enabled and each row of the table becomes the subject of an update operation (e.g., even if a null update operation) which in turn causes the trigger to fire and to populate the new columns. The cross-edition trigger will also fire if the running application inserts or updates data in the table. This keeps the new columns in sync with ongoing changes from the running application.

Data Upgrade Example

The following is an abbreviated example of online patching data upgrade. Consider an existing table having the following columns:

| TASK_NAME | VARCHAR2(30) |
|---|---|
| DESCRIPTION | VARCHAR2(240) |
| STATUS | VARCHAR2(8) |
| 'ACTIVE' | - open task, normal priority |
| 'URGENT' | - open task, high priority |
| 'DONE' | - closed task, completed |

In the run edition, this table will be covered by an editioning view having corresponding (e.g., identical) column structure:

| EV_COLUMN | TABLE_COLUMN |
|---|---|
| TASK_NAME -> | TASK_NAME |
| DESCRIPTION -> | DESCRIPTION |
| STATUS -> | STATUS |

Now consider a change to the table to store the task priority in a separate column. Instead of modifying the existing data in place (which would cause undesired behavior in the running application), create new columns to hold the upgraded data, as follows:

| TASK_NAME | VARCHAR2(30) |
|---|---|
| DESCRIPTION | VARCHAR2(240) |
| STATUS | VARCHAR2(8) - old status |
| STATUS#1 | VARCHAR2(8) - revised status column |
| 'ACTIVE' | - open task, ready to be worked |
| 'DONE' | - closed task, completed |

| | |
|---|---|
| PRIORITY | VARCHAR2(8) - new priority flag |
| 'NORMAL' | - normal priority |
| 'URGENT' | - urgent priority |

The updated table results in a regenerated editioning view in the patch edition. The new editioning view looks like this:

| EV_COLUMN | TABLE_COLUMN |
|---|---|
| TASK_NAME -> | TASK_NAME |
| DESCRIPTION -> | DESCRIPTION |
| STATUS -> | STATUS#1 |
| PRIORITY -> | PRIORITY |

To continue the upgrade, the developer writes a cross-edition trigger to populate the new columns. The trigger executes "per row", so that it can be re-applied to ongoing updates from the running application:

```
create trigger FND_TASKS_X1
    before insert or update on APPLSYS.FND_TASKS
    for each row
    forward crossedition
    disable
begin
    if :new.STATUS = 'URGENT' then
        :new.STATUS#1 := 'ACTIVE';
        :new.PRIORITY := 'URGENT';
    else
        :new.STATUS#1 := :new.STATUS;
        :new.PRIORITY := 'NORMAL';
    end if;
end;
```

The trigger name is defined to be unique across all applications in the application system. Strictly as an example, triggers can be named according to a standard. Possible naming standards include:

```
<application_short_name>_<table_short_name>_X<version>
<application_short_name>_<table_short_name>_F<version>
<application_short_name>_<table_short_name>_R<version>
```

As define hereinabove, the trigger fires before an insert or update on the table being patched, firing once for each row. The cross-edition clause causes the trigger to fire on certain events from the run edition, but execute using code in the patch edition. As shown, the trigger specification specifies the disable option so that it will not start firing on its initial creation. The trigger can be enabled during an APPLY step (see FIG. 2).

Figure 1D:
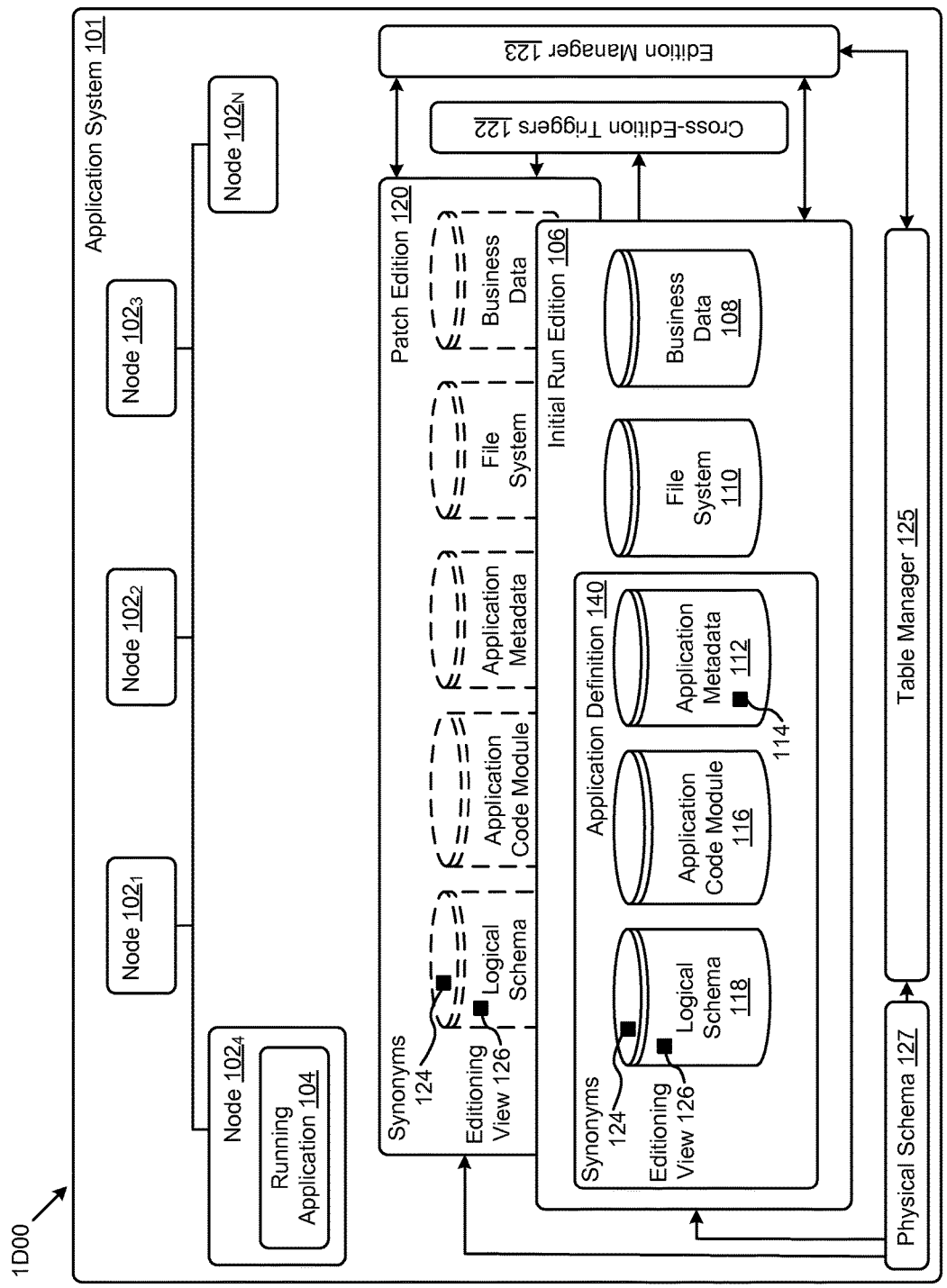
FIG. 1D depicts a run edition being transformed into a patch edition in an installation using a data dictionary to automatically determine an upgrade edition of a relational database table, according to some embodiments.

FIG. 1D depicts a run edition being transformed into a patch edition in an installation 1D00 using a data dictionary to automatically determine an upgrade edition of a relational database table. As an option, the present installation 1D00 may be implemented in the context of the architecture and functionality of the embodiments described herein. Also, the installation 1D00 or any aspect therein may be implemented in any desired environment.

As shown, the installation comprises an application system 101 (e.g., a cluster environment, a portion of a database engine, etc.) which in turn comprises computing nodes (e.g., node $102_1$, node $102_2$, node $102_3$, node $102_4$, node $102_N$, etc.) any of which computing nodes can communicate with any other of the computing nodes. A software application (e.g., running application 104) executes on a computing node and accesses stored data (e.g., business data 108, one or more instances of a file system 110). A software application can also access stored data in various application-specific embodiments (e.g., application metadata 112, application code modules 116, and logical schema 118).

The application code modules 116 serve to store one or more copies of the software application, while the application metadata 112 serves to store data that is specific to the application (e.g., disjoint from the business data 108). The application metadata 112 can comprise application-specific data in the form of seed data 114, which can be used by the application to initialize data structures (e.g., screens, forms, menus, etc.) used by a running software application.

In addition to the editioned tables and views as discussed above, a particular collection of interrelated components in a database system (e.g., application metadata 112, application code modules 116, logical schema 118, business data 108, one or more instances of a file system 110, etc.) can be amalgamated into an "edition" (e.g., an initial run edition 106), which edition can then be subjected to transformations (e.g., data copies, data references, data conversions, etc.) into one or more other editions (e.g., patch edition 120), as shown.

In order to facilitate for reducing downtime during upgrades of interrelated components in a database system, the collection of interrelated components are handled using the techniques disclosed herein. Strictly as an example, an instance of a running software application can access an initial run edition, or an instance of a running software application can access a patch edition. Various techniques for managing the timing and type of access are provided for by the editioning view 126 and by use of synonyms 124. For example, a synonym can be modified to refer to a logical schema of the initial run edition, or a synonym can be modified to refer to a logical schema of a patch edition.

As can be recognized by those skilled in the art, a first instance of a running software application can access and make changes to an initial run edition, and such changes can be detected and propagated to a patch edition using the cross-edition triggers 122. Thus, the second instance of the running software application can access the changes that had been propagated to the patch edition.

The various techniques for copying, referencing, transforming and otherwise managing the location (e.g., physical copy, virtual copy, etc.) of data, as well as techniques for managing the timing and type of access observed by the running software application, are discussed in detail infra "The Application"

A running installation of a suite of enterprise software applications comprises a vast and complex system made up of many individual parts that are broadly separated into a taxonomy as follows:

A platform (e.g., storage hardware and software, servers, network components, OS, database hardware and software, middleware hardware and software, system management hardware and software, etc.), and One or more software applications (e.g., application code modules, application schema, code, application metadata, etc.).

Components within an installation can be further described as comprising:

Application Schema: Application schema codifies a relational data model for accessing items stored in the application system 101 (e.g., tables, relationships, indexes, etc.). An instance of application schema defines the structure of the data being managed—it is not the data itself. The application schema is often managed while observing a two-layer approach comprising physical schema and logical schema:

The physical schema describes how information is actually stored in database tables.

The logical schema is a stable view of the relevant parts of the physical schema presented to the application code modules. The logical schema is often defined in terms of the physical schema using synonyms, views and access policies. In exemplary embodiments, the logical schema defines what is "seen" when an application code module connects to the relational data.

Application Code Modules: These modules comprise executable logic that controls how the application operates. Instances of application code modules run on the database, middle-tier application servers, and in client devices. Application code modules can be written in a variety of programming and/or scripting languages.

Application Metadata: This is data that participates in controlling how the application operates (e.g., initial look-and-feel, user customizations, etc.). This data can be stored in files on the file system, and/or in tables in a database. Metadata that is loaded into database tables is called "seed data". In some cases, metadata can be altered during application runtime. Users often edit application metadata to tailor functionality to their particular user-specific requirements.

Business Data: This often refers to customer-owned transaction data or reference data that is stored in accordance with the application schema. Uses of patches as herein described can modify how business data is stored (e.g., corresponding to an instance of an application schema) however, the patching embodiments herein do not explicitly create or explicitly delete customer business data.

The techniques described herein provide for online patching of applications (and respective application data) as well as for the online patching and online transformation of business data (e.g., transformation to an updated application schema).

Application Editions

A collection of schema, code and metadata definitions comprise an application definition 140. Components of the application definition may need to change over time, and the techniques herein prescribe how each part of the application definition are to be versioned and patched independently. Therefore, an application definition in a particular installation is known by a compound "version ID" comprised of the union of the versions of all of its constituent parts. An installed collection of versioned part definitions is referred to as an application edition. In exemplary cases, an application definition is stored both on the file system and in the database. Further it is typical to store multiple application editions within one installation, and in such cases both the file system and database are used to hold a run edition version and one or more patch edition versions of the application definition.

In the context of the installation depicted and described in FIG. 1C, and following the purpose and definition of an edition and an edition's constituent components, a cycle can be followed so as to upgrade editions in a database system while maximizing the availability of the installation's functionality.

Figure 2:
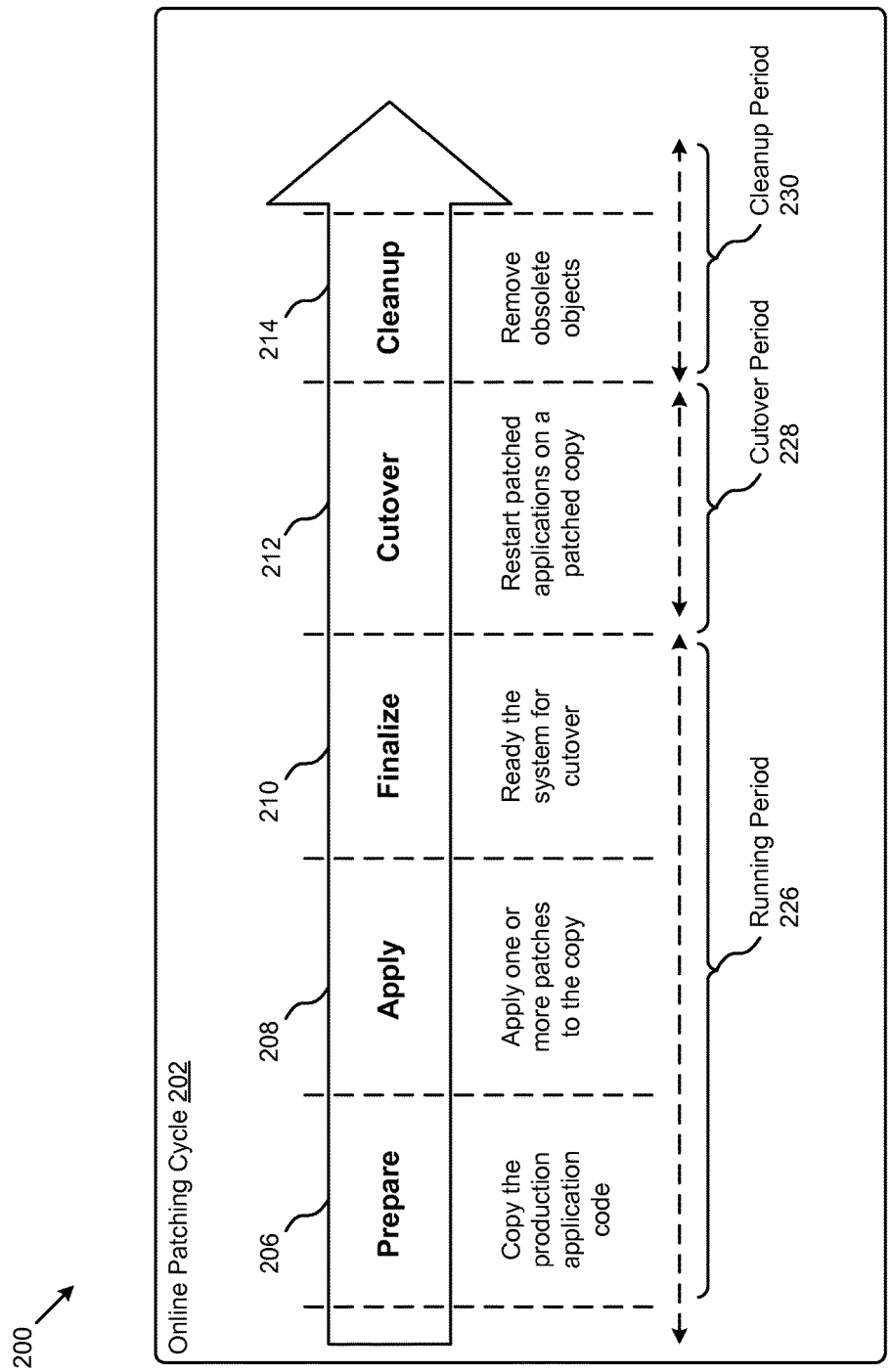
FIG. 2 is a cycle diagram showing an upgrade patching cycle in which can be practiced techniques for using a data dictionary to automatically determine an upgrade edition of a relational database table, according to some embodiments.

FIG. 2 is a cycle diagram 200 showing an upgrade patching cycle in which can be practiced techniques for using a data dictionary to automatically determine an upgrade edition of a relational database table. As an option, the present cycle diagram 200 may be implemented in the context of the architecture and functionality of the embodiments described herein. Also, the cycle diagram 200 or any aspect therein may be implemented in any desired environment.

To apply an online patch to an active/online installation, the installation is promoted through a series of sequential phases known as an online patching cycle. The shown online patching cycle 202 is given as:

PREPARE a patch edition (see online patch cycle prepare step 206).

APPLY a patch or patches to a patch edition (see online patch cycle apply step 208).

FINALIZE to get the system ready for cutover (see online patch cycle finalize step 210).

CUTOVER to the patch edition (see online patch cycle cutover step 212).
  Shutdown software applications and application services.
  Set patch edition as the new run edition.
  Startup software applications and application services.

CLEANUP old objects or editions (see online patch cycle cleanup step 214).

As described in the above cycle, creating and patching relies on many specialized techniques to maintain a run edition (e.g., initial run edition 106) and one or more patch editions (e.g., patch edition 120) in the presence of continuously changing customer data in database tables (e.g., in the business data 108). This concept and its implementation creates patch edition copies of application code modules and data in order to continuously apply patch transformations to runtime data that changes while the patch is executing.

The users can be all online users during the normal operation (e.g., during the running period 226), then for the brief period of the cutover (e.g., during the cutover period 228) the users are offline, to return online (e.g., in cleanup period 230) shortly after the conclusion of the period of the cutover.

One embodiment supports full installation online patching. Some installations comprise many products (e.g., hundreds of software application configurations, and many tens of thousands of tables). In such a case it is convenient to deploy every installation to contain all products (though only some may be licensed for a particular installation) and then to patch all products that are included in every installation. In this manner, all products can be periodically updated to stay current with the recommended code levels.

Implementing the above cycle to manage edition components for reducing downtime during upgrades relies in part on a particular configuration of an edition. An approach to forming such a particular configuration of an edition is discussed below. In particular, the flow of FIG. 3 includes steps for identifying up-revised storage columns using a data dictionary to automatically determine an upgrade edition of a relational database table. Yet, in order to use these upgrade editions consistently within an application system, certain application standards are enforced.

Returning to the discussion of FIG. 1B, specifically, the upgrade operation applied to the identified applications (see operation 174), the procedure 1B00 loops through the set of applications (see iterator 172), and the operation 174 serves to enforce a coding standard on each application such that the application developer need not be aware of the specific edition that is deemed to be the then current edition. Aspects of the coding standard and an installation procedure are briefly described as follows:

The application system 101 contains synonyms that point to respective tables used at application runtime. All runtime table accesses go through the synonym "layer"; thus, application code does not directly reference physical tables. The editioning view is installed "between" the synonym and the physical table. Upon installation, the system re-points the synonym to point to the editioning view instead of pointing to the physical table. From the moment of editioning view installation and onward, table access goes through the editioning view, which view provides the logical-to-physical column name mapping. One embodiment of editioning view installation implements the following changes for physical tables:

Generate the editioning view for the table.
Re-point any synonym for the table to the editioning view instead.
Move or copy any table triggers to the editioning view.
Move or copy any table access control policies to the editioning view.
Copy any privilege grants on the table to the editioning view.

Further, the installation procedure includes steps to determine the "newest" column definitions. As is known in the art, an application developer might pursue an upgrade to implement through several iterations of code. And any iteration might use a variation of data storage in a column of a table. Accordingly, some embodiments support automatic identification of the "newest" column definitions.

In some embodiments, the definition of the editioning view is completely automated (e.g., generated or derived) from the table on which it is based. Strictly as an example, an editioning view definition can be based on versioned table columns. Table columns are either base columns (e.g., comprising its attributes as originally defined) or can be revised columns (e.g., version-identified patched versions of a base column). Table columns can use the following naming standard:

---
Base Column: <logical_column_name>
Revised Column: <logical_column_name>#<version>
---

For example:

---
Base Column: INTEREST_RATE
Revised Column: INTEREST_RATE#2
---

The table manager generates an editioning view that maps the logical column name to the latest revision of that column. In the embodiments discussed herein, a revision is considered "later" than another if its revision indicator (e.g., version tag) is determined to be greater than the other version tag. Strictly as one example, such a determination can be made using a numeric comparison or, in another embodiment, such a determination can be made using a string comparison (e.g., 'INTEREST_RATE#20'>'INTEREST_RATE#191').

Figure 3:
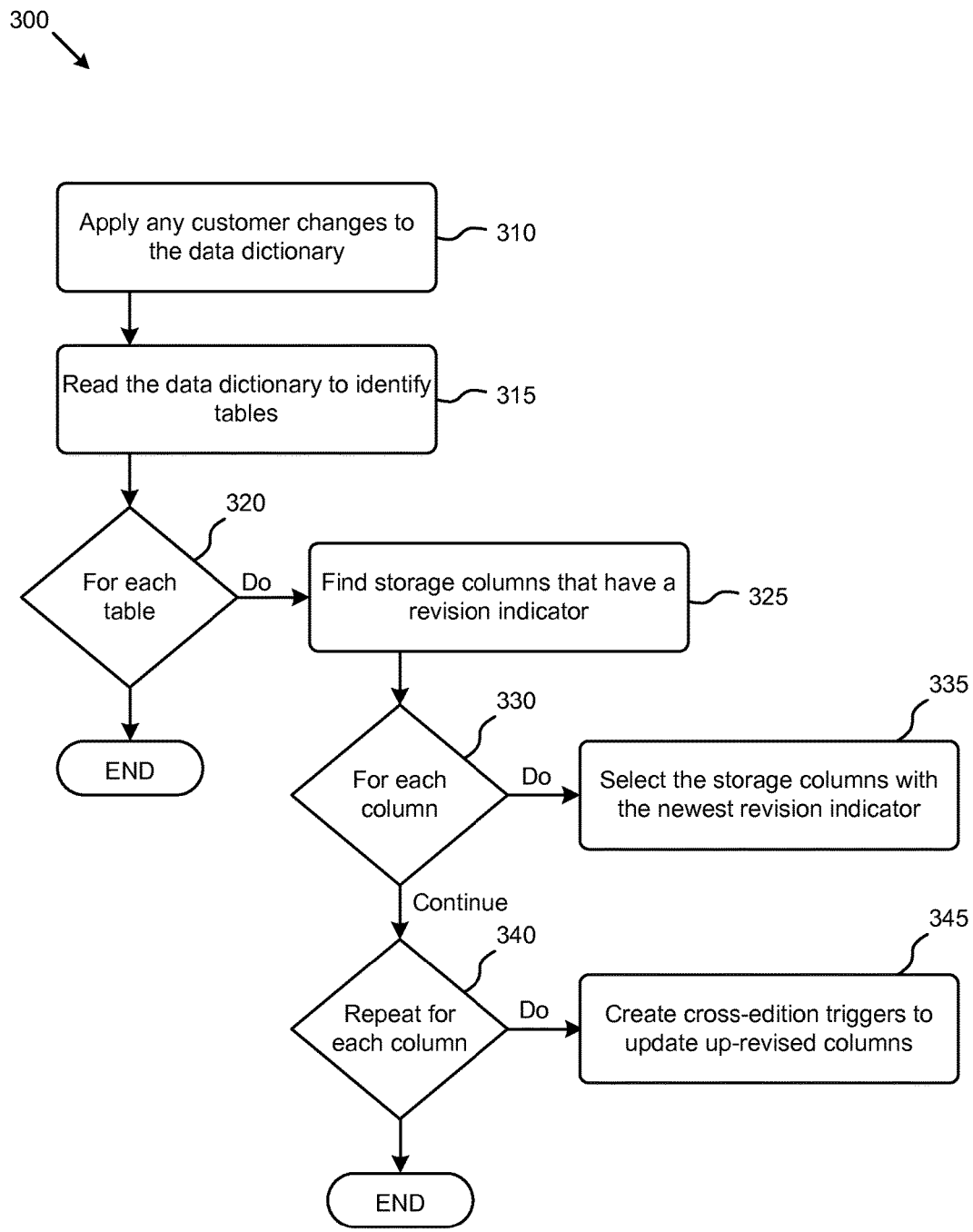
FIG. 3 is a flow for identifying up-revised storage columns using a data dictionary to automatically determine an upgrade edition of a relational database table, according to some embodiments.

FIG. 3 is a flow 300 for identifying up-revised storage columns using a data dictionary to automatically determine an upgrade edition of a relational database table. As an option, the present flow 300 may be implemented in the context of the architecture and functionality of the embodiments described herein. Also, the flow 300 or any aspect therein may be implemented in any desired environment.

As shown, the flow 300 commences by applying any custom changes (e.g., customer-generated changes) to the data dictionary (see operation 310), then reading the data dictionary to identify tables (see operation 315).

For each so identified table, operation 325 serves to find the storage columns that have a revision indicator, finding exhaustively using an iterator 320. Then, for each such storage column (see iterator 330), find the storage column that has the latest version indicator (see operation 335). Also, using a loop (see iterator 340) create cross-edition triggers for the up-revised columns (see operation 345).

Of course, over time, it is possible that successive changes may be made to the data dictionary, thus, the flow 300 can be repeated any time the data dictionary is patched. In some embodiments, the table manager determines if the edition view needs to be regenerated and will execute all or a portion of flow 300 if necessary.

Figure 4:
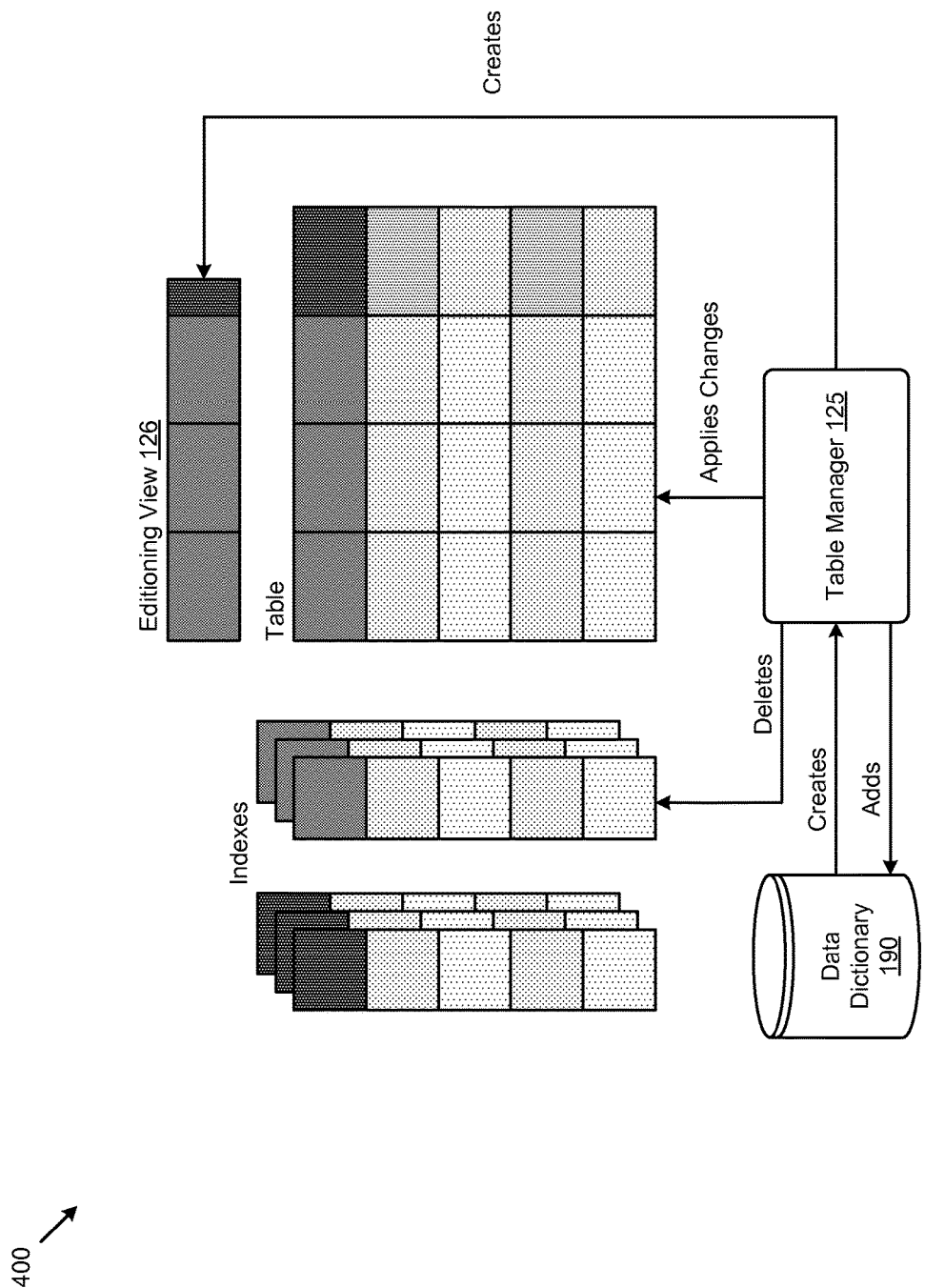
FIG. 4 is a sample implementation of a table manager using a data dictionary to automatically determine an upgrade edition of a relational database table, according to some embodiments.

FIG. 4 is a sample implementation 400 of a table manager using a data dictionary to automatically determine an upgrade edition of a relational database table. As an option, the present sample implementation 400 may be implemented in the context of the architecture and functionality of the embodiments described herein. Also, the sample implementation 400 or any aspect therein may be implemented in any desired environment.

As shown, the table manager 125 reads a data dictionary 190, creates an editioning view 126, and applies changes (e.g., via cross-edition triggers). Specific techniques are discussed above. Additionally, the table manager 125 creates and/or deletes indexes and/or otherwise maintains indexes (see indexes, as shown).

Index Maintenance

Indexes are defined on table columns. If a table change creates a revised column for any existing indexed column, then the developer must also update the affected indexes to use the new revised column. As a safety measure, the table manager will also detect and automatically revise any out of date indexes during the FINALIZE phase.

Revised indexes are initially created so that index creation does not interfere with the running applications. A process will automatically convert the original index definition to the revised form when running in the patch edition. Then, during the cutover phase, the original index is dropped, and the revised index is renamed to the original index name. In a similar fashion, primary key constraints, foreign key constraints, and unique key constraints are maintained as are indexes.

Figure 5:
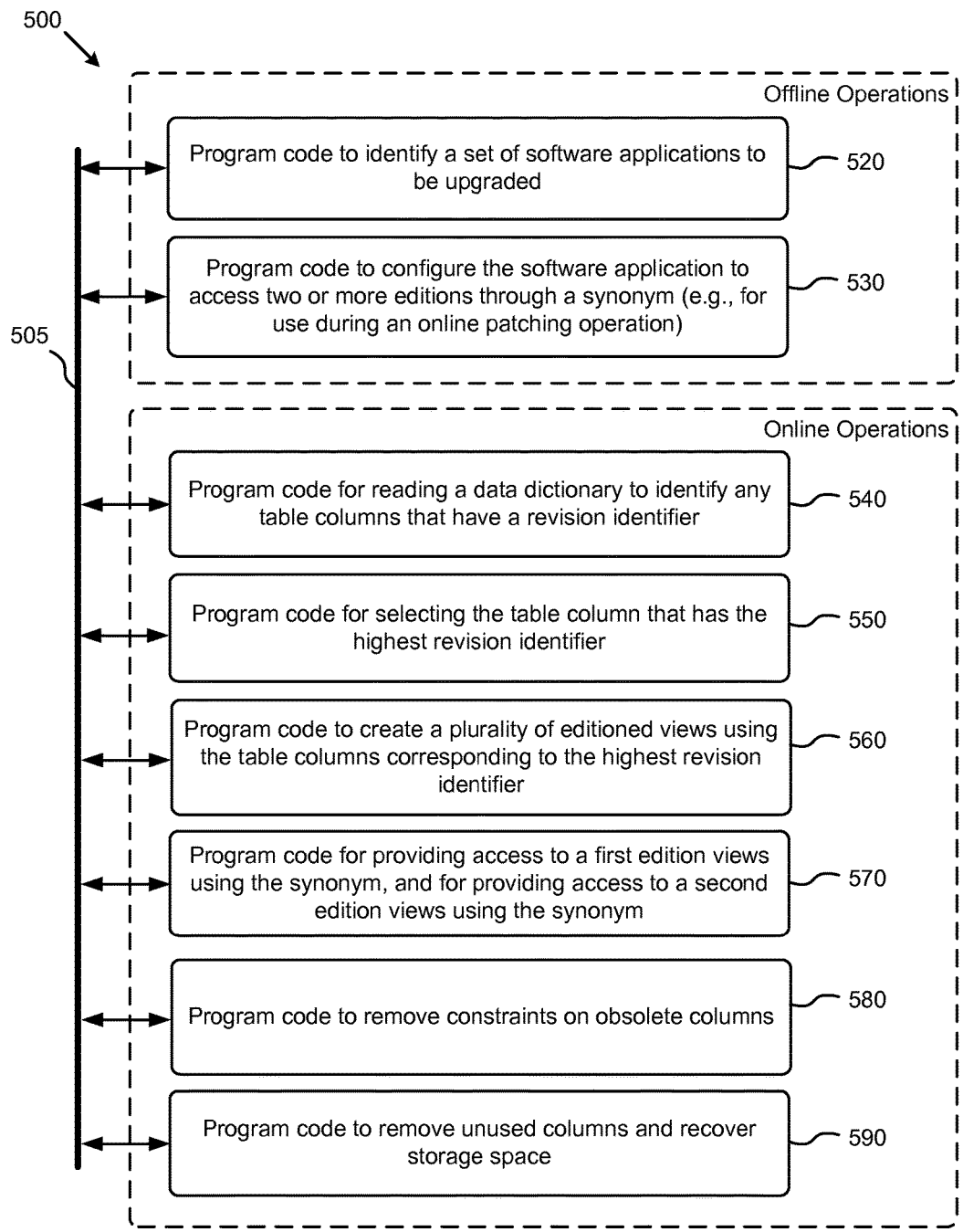
FIG. 5 is a system of offline and online steps performed for using a data dictionary to automatically determine an upgrade edition of a relational database table, according to some embodiments.

FIG. 5 is a system 500 of offline and online steps performed for using a data dictionary to automatically determine an upgrade edition of a relational database table. As an option, the present system 500 may be implemented in the context of the architecture and functionality of the embodiments described herein. Also, the system 500 or any aspect therein may be implemented in any desired environment.

As shown, system 500 comprises at least one processor and at least one memory, the memory serving to store program instructions corresponding to the operations of the system. As shown, an operation can be implemented in whole or in part using program instructions accessible by a module. The modules are connected to a communication path 505, and any operation can communicate with other operations over communication path 505. The modules of the system can, individually or in combination, perform method operations within system 500. Any operations performed within system 500 may be performed in any order unless as may be specified in the claims.

The embodiment of FIG. 5 implements a portion of a computer system, shown as system 500, comprising a subsystem having a data dictionary describing one or more relational database tables, the one or more relational database tables having a column to hold an edition indicator configurable to provide access to two or more editions through a synonym and a computer processor to execute a set of program code instructions (not shown) and modules for accessing memory to hold program code instructions to perform: identifying a set of software applications to be upgraded (see module 520); configuring at least one of the software applications to access two or more editions through a respective synonym (see module 530); reading a data dictionary to identify at least two relational database table columns that have a revision identifier (see module 540), and program code for providing access to a first edition views using a first synonym, as well as providing access to a second edition view using a second synonym (see module 570).

Some embodiments further comprise program code for creating a plurality of editioned views using the table columns corresponding to the highest revision identifier (see module 550); and program code to create a plurality of editioned views using the table columns corresponding to the highest revision identifier (see module 560).

Some embodiments further comprise program code to execute in a phase of an online patching cycle (e.g., in the cutover phase), such that the table manager removes constraints on obsolete columns (e.g., columns that have been replaced or become unused since they do not appear in the editioned view) so that they do not impact or interfere with the operation of applications referencing the new edition (see module 580). For example, removing a "not null" constraint on a column that will no longer be populated would have desired effects, including reducing runtime compute requirements to enforce the "not null" constraint. Further, during the cleanup phase, the table manager may optionally remove unused columns altogether (e.g., de-allocate previously allocated space space), which cleanup operation serves to recover storage space (see module 590).

Additional Embodiments of the Disclosure

Figure 6:
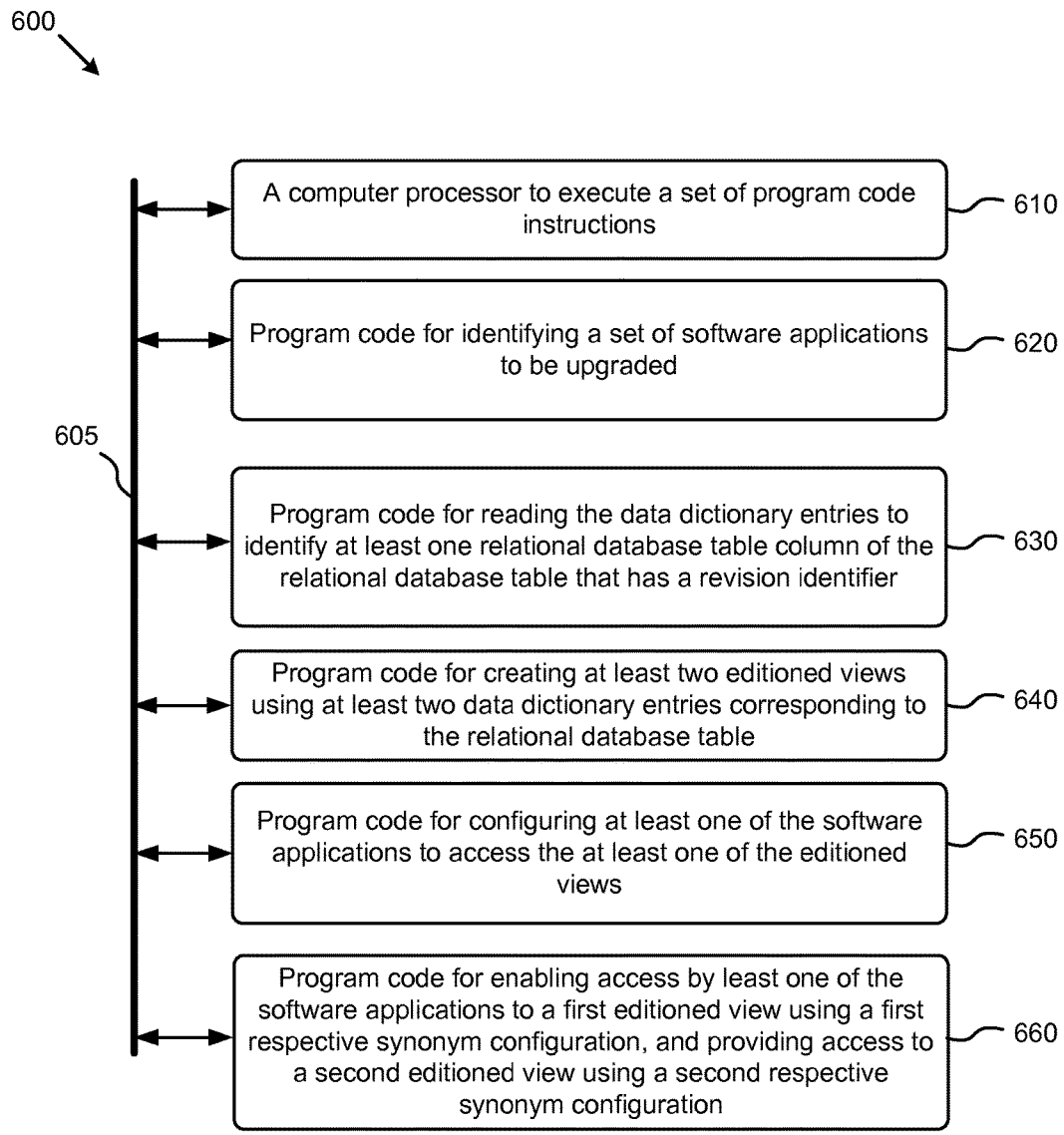
FIG. 6 is a system for using a data dictionary to automatically determine an upgrade edition of a relational database table, according to some embodiments.

FIG. 6 is a system 600 for using a data dictionary to automatically determine an upgrade edition of a relational database table. As an option, the present system 600 may be implemented in the context of the architecture and functionality of the embodiments described herein. Of course, however, the system 600 or any operation therein may be carried out in any desired environment.

As shown, system 600 comprises at least one processor and at least one memory, the memory serving to store program instructions corresponding to the operations of the system. As shown, an operation can be implemented in whole or in part using program instructions accessible by a module. The modules are connected to a communication path 605, and any operation can communicate with other operations over communication path 605. The modules of the system can, individually or in combination, perform method operations within system 600. Any operations performed within system 600 may be performed in any order unless as may be specified in the claims.

The embodiment of FIG. 6 implements a portion of a computer system, shown as system 600, comprising a computer processor to execute a set of program code instructions (see module 610) and modules for accessing memory to hold program code instructions to perform: identifying a set of software applications to be upgraded (see module 620); reading the data dictionary entries to identify at least one relational database table column of the relational database table that has a revision identifier (see module 630); creating at least two editioned views using at least two data dictionary entries corresponding to the relational database table (see module 640); configuring at least one of the software applications to access one or more of the at least two editioned views through respective synonyms (see module 650); and enabling access by least one of the software applications to a first editioned view using a first respective synonym, and providing access to a second editioned view using a second respective synonym (see module 660).

Figure 7:
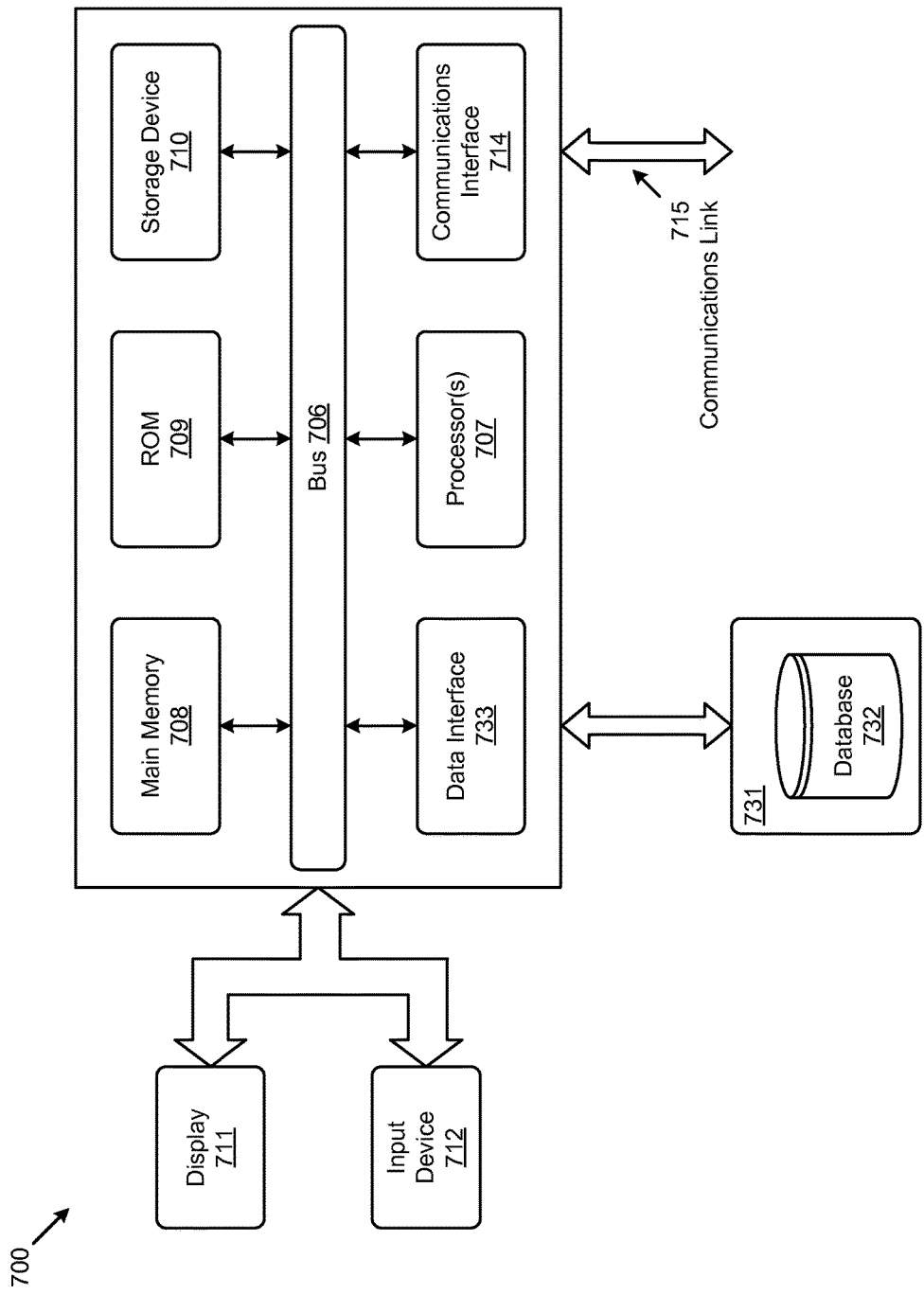
FIG. 7 depicts a block diagram of an instance of a computer system suitable for implementing an embodiment of the present disclosure.

FIG. 7 depicts a block diagram of an instance of a computer system 700 suitable for implementing an embodiment of the present disclosure. Computer system 700 includes a bus 706 or other communication mechanism for communicating information, which interconnects subsystems and devices, such as a processor 707, a system memory 708 (e.g., RAM), a static storage device (e.g., ROM 709), a disk drive 710 (e.g., magnetic or optical), a data interface 733, a communication interface 714 (e.g., modem or Ethernet card), a display 711 (e.g., CRT or LCD), input devices 712 (e.g., keyboard, cursor control), and an external data repository 731.

According to one embodiment of the disclosure, computer system 700 performs specific operations by processor 707 executing one or more sequences of one or more instructions contained in system memory 708. Such instructions may be read into system memory 708 from another computer readable/usable medium, such as a static storage device or a disk drive 710. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 707 for execution. Such a medium may take many forms, including but not limited to, non-volatile media and volatile media. Non-volatile media includes, for example, optical or magnetic disks, such as disk drive 710. Volatile media includes dynamic memory, such as system memory 708.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 700. According to certain embodiments of the disclosure, two or more computer systems 700 coupled by a communications link 715 (e.g., LAN, PTSN, or wireless network) may perform the sequence of instructions required to practice the disclosure in coordination with one another.

Computer system 700 may transmit and receive messages, data, and instructions, including programs (e.g., application code), through communications link 715 and communication interface 714. Received program code may be executed by processor 707 as it is received, and/or stored in disk drive 710 or other non-volatile storage for later execution. Computer system 700 may communicate through a data interface 733 to a database 732 on an external data repository 731. A module as used herein can be implemented using any mix of any portions of the system memory 708, and any extent of hard-wired circuitry including hard-wired circuitry embodied as a processor 707.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method for using a data dictionary to automatically determine an upgrade edition of relational database table, the method comprising:
   identifying a set of applications to be upgraded, wherein the set of applications respectively access a plurality of relational database table views of a physical relational database table;
   receiving a data dictionary associated with the set of applications, wherein the data dictionary comprises at least entries pertaining to the physical relational database table, wherein the physical relational database comprises same underlying data in a plurality of columns, and wherein the data dictionary comprises entries that codify data representation of the physical relational database table having the same underlying data in the plurality of columns;
   for a respective application of the set of applications, performing a set of acts that comprises:
      acquiring, from the data dictionary, respective entries of the physical relational database table corresponding to a respective relational database table view for the respective application; and
      based at least in part on the respective entries received from the data dictionary, identifying one or more columns having a corresponding revision identifier, wherein
         the one or more columns are associated with the respective application and are accessible by a first synonym that provides an access point to at least one of the physical relational database table, one or more respective application editions, or one or more relational database table views, and
         the revision identifier pertains to the one or more changes to be applied to the respective relational database table view associated with a respective application run edition of the respective application;
   creating a first relational database table view for a first application edition of the respective application at least by:
      populating the first relational database table view with first data from a first subset of columns of the plurality of columns based at least in part upon at least a first edition identifier associated with at least one column of the first subset of columns of the physical relational database table, and
      defining the first synonym that points to the first relational database table view of the physical relational database table, wherein the first application edition uses the first synonym to access or manage the first relational database table view of the physical relational database table;
   creating a second relational database table view for a second application edition of the respective application at least by:
      populating the second relational database table view with first modified data from a second subset of columns of the plurality of columns based at least in part upon a second revision identifier associated with the physical relational database table, wherein the second application manages or accesses the second relational database table view, and
      defining a second synonym that points to the second relational database table view of the physical relational database table, wherein the second application edition uses the second synonym to access or manage the second relational database table view of the physical relational database table, and both the first synonym and the second synonym point to a same physical relational database table;
   identifying an application definition with an application version identifier that comprises multiple versions of constituent parts of the application definition, the application definition comprising a collection of schema, code, and metadata definitions;
   determining a collection of first versioned part definitions for the first application edition of the respective application;
   determining a collection of second versioned part definitions for the second application edition of the respective application;
   initiating a cutover at least by upgrading or patching the respective application from the first application edition operating upon the first relational database table view to the second application edition operating upon the second relational database table view;
   performing an online patch that includes the cutover for the respective application from the respective application run edition to a respective application patch edition of the one or more application editions, wherein performing the online patch comprises:
      executing an online patching or upgrading cycle for the respective application at least by identifying a patch or upgrade, and applying the patch or upgrade to the second application edition of the respective application;
      identifying continuously changing runtime data for the respective application;
      generating one or more additional editions at least by creating a plurality of application code modules and data for repeated applications of transformations to at least a part of the data; and
      continuing execution of the online patching or upgrading cycle for the respective application at least by continuously applying transformations to the continuously changing runtime data that changes while the online patching or upgrading cycle is executing;
   finalizing the online patch of the respective application to the respective application patch edition;
   repointing at least one synonym of the physical relational database table to the second synonym associated with the second relational database table view;
   setting the second application edition as a new run edition of the respective application;

shutting down the first application edition of the application after the second application edition is finalized for the cutover;

subsequently starting up the new run edition that was set from the second application edition of the respective application, after the first application edition is shut down, such that one or more users accessing the first application edition are offline until the second application edition of the application is started, wherein the first relational database table view and the second relational database table view are generated based on the same underlying data in the physical relational database table;

syncing the first subset of columns in the first relational database table view with the second subset of columns in the second relational database table view at least by executing a plurality of triggers, wherein during execution of the plurality of triggers, each trigger of the plurality of triggers populates changes from one subset of the first and second subsets of columns to another subset of the first and second subsets of columns; and cleaning up the first application edition of the respective application.

2. The computer implemented method of claim 1, transitioning the respective application from the first application edition to the second application edition comprising:

automatically defining a plurality of relational database table views at least by:

identifying one or more base columns in the physical relational database table;

identifying one or more revised columns in the physical relational database table;

identifying a naming standard for the plurality of columns in the physical relational database table;

wherein the naming standard comprises a first naming standard for the one or more base columns and a second naming standard for the one or more revised columns; and determining one or more revised column names for the one or more revised columns, wherein the one or more revised column names include one or more revised column identifiers and a plurality of revision numbers, wherein the one or more revised column names are respectively derived from one or more base column identifiers of the one or more base columns;

implementing a structure change that transforms data into the first modified data;

storing the first modified data with at least the second edition identifier into the subset of columns in the physical relational database table, wherein the first modified data is compatible with the second application edition but incompatible with the first application edition, upon or after a first installation of the first relational database table view, pointing the synonym for the physical relational database table to the first synonym; and moving or copying one or more triggers that comprise the at least one trigger to the first relational database table view;

pointing the synonym for the physical relational database table to the second synonym;

moving or copying the one or more triggers that comprise the at least one trigger to the second synonym; and maintaining the same underlying data in both the first relational database table view and the second relational database table view at least by:

identifying one or more columns in one relational database table view for populating a data change with an execution of the trigger, wherein the data change is made in one or more corresponding columns in another relational database table view of the first and second relational database table views; and populating the data change with the execution of the trigger into the one or more columns in the one relational database table view of the first and second relational database table views.

3. The computer implemented method of claim 1, further comprising:

identifying a latest revision of an attribute that is editioned at least by accessing the data dictionary;

for the attribute, identifying a plurality of first relational database table physical columns in the physical relational database table;

determining a plurality of first logical names for the plurality of first relational database table physical columns, respectively;

generating the first relational database table view representing the plurality of first relational database table physical columns using the plurality of first logical names;

for the attribute, identifying a plurality of second relational database table physical columns in the physical relational database table;

determining a plurality of second logical names for the plurality of second relational database table physical columns, respectively;

generating the second relational database table view representing the plurality of second relational database table physical columns using the plurality of second logical names;

repeating generation of additional relational database table views for one or more additional attributes that are editioned using corresponding relational database table physical columns and logical names;

identifying a plurality of physical relational database tables including the physical relational database table;

identifying a plurality of applications accessing the plurality of physical relational database tables including the physical relational database table;

managing timing and a type of access of the plurality of applications at least by modifying one or more synonyms to refer to a logical schema of a run edition or of a patch edition;

determining whether each application of the plurality of application is to be editioned;

enforcing a coding standard on one or more applications of the plurality of applications without knowledge of which edition is a then current edition of the one or more applications;

identifying a set of physical relational database tables that are to be editioned at least by accessing the data dictionary;

iteratively generating an editioned view using a column stripe for each physical relational database table and each affected physical column in the set of physical relational database tables;

maintaining the first relational database table view and the second relational database table view for the physical relational database table, which is not a hidden, internal, or temporary table, at least by defining the physical relational database table in a physical schema, identifying a table synonym characterized by being capable of pointing to the physical relational database table, and managing the physical relational database table using a table manager or an edition manager during a patching cycle;

referencing one or more first synonyms for the first relational database table view that maps first logical column names to first physical column names;

referencing one or more second synonyms for the second relational database table view that maps second logical column names to second physical column names;

determining whether an upgrade or patch to the physical relational database table is incompatible with one or more running applications at least by reading a plurality of entries in the data dictionary;

implementing and storing updates for the upgrade or patch in newly created columns, and updating the first relational database table view to reference the newly created columns to form the second relational database table view when the upgrade or patch is determined to be incompatible with the one or more running applications;

upgrading a first application of the one or more applications at least by creating new base columns or revising existing columns to hold data pertaining to the upgrade or patch;

preventing the new base columns or the existing columns from being accessed by the run edition for the first application;

rendering the new base columns or the existing columns visible to the patch edition for the first application at least by regenerating an editioning view to include the new base columns or the existing columns for the patch edition for the first application;

populating the new base columns or the existing columns with a cross-edition trigger that receives an input from columns in the first relational database table view, computes new values for the columns, and stores the new values in new corresponding columns in the second relational database table view;

applying the cross-edition trigger to the physical relational database table on a row-by-row basis, and before insert or update operations on the physical relational database table, by using at least a cross-edition clause;

amalgamating application metadata, application code modules, the logical schema, business data, and one or more instances of a file system into the run edition;

transforming the run edition into the patch edition at least by performing data copies, data references, and data conversions on at least a part of the run edition; and identifying a set of software applications to be upgraded, then enabling access by at least one of the set of software applications to the first relational database table view using the first configuration, and providing access to the second relational database table view using the second configuration.

4. The computer implemented method of claim 1, further comprising configuring a synonym in a first configuration to access a first one of the relational database table views, and configuring the synonym in a second configuration to access a second one of the relational database table views, wherein creating at least a second relational database table view creates an editioned view using one or more table columns corresponding to a highest revision identifier.

5. The computer implemented method of claim 4, further comprising:
removing constraints on columns that appeared in a first view but do not appear in the editioned view; and
deallocating storage space corresponding to the columns that appeared in a first view but do not appear in the editioned view.

6. The computer implemented method of claim 1, further comprising:
determining an initial file system edition for the physical relational database table, the initial file system edition comprising at least one instance of a running file system and a running file system format for the first application edition of the physical relational database table;
identifying running file system contents for the at least one instance of the running file system, the running file system contents including the application definition and application metadata that control how the respective application operates;
creating an upgraded file system edition for an upgraded file system that includes upgraded file system contents for upgrading the running file system to the upgraded file system; and
during the cutover, upgrading the initial file system edition to the upgraded file system edition, while upgrading or patching the respective application from the first application edition to the second application edition.

7. The computer implemented method of claim 1, wherein the first application edition of the application comprises a collection of versioned application definitions, and a versioned application definition includes a schema, application code, and one or more metadata definitions.

8. The computer implemented method of claim 1, further comprising:
identifying the first application edition of the application as a run edition of the application; and
determining the second application edition of the application by performing a set of acts, the set of acts comprising applying one or more patches to the second application edition.

9. The computer implemented method of claim 8, further comprising:
shutting down at least one of:
the first application edition of the application and;
one or more services associated with the first application edition of the application or with the application; and
identifying the second application edition as the run edition of the application.

10. The computer implemented method of claim 9, further comprising:
causing one or more users to be offline during a cutover period of time;
starting the second application edition by starting the run edition; and
causing the one or more users to be return online using the second application edition of the application after the cutover period of time.

11. A computer system for using a data dictionary to automatically determine an upgrade edition of a physical relational database table, comprising:
a computer processor to execute a set of program code instructions; and
a memory to hold the program code instructions which, when executed by the computer processor, cause the computer processor at least to:

identify a set of applications to be upgraded, wherein the set of applications respectively access a plurality of relational database table views of a physical relational database table;

receive a data dictionary associated with the set of applications, wherein the data dictionary comprises at least entries pertaining to the physical relational database table, wherein the physical relational database comprises same underlying data in a plurality of columns, and wherein the data dictionary comprises entries that codify data representation of the physical relational database table having the same underlying data in the plurality of columns;

for a respective application of the set of applications, execute the program code instructions, execution of the program code instructions by the computer processor further causing the computer processor to:

acquire, from the data dictionary, respective entries of the physical relational database table corresponding to a respective relational database table view for the respective application; and based at least in part on the respective entries received from the data dictionary, identify one or more columns having a corresponding revision identifier, wherein the one or more columns are associated with the respective application and are accessible by a first synonym that provides an access point to at least one of the physical relational database table, one or more respective application editions, or one or more relational database table views, and the revision identifier pertains to the one or more changes to be applied to the respective relational database table view associated with a respective application nm edition of the respective application;

create a first relational database table view for a first application edition of the respective application at least by:

populating the first relational database table view with first data from a first subset of columns of the plurality of columns based at least in part upon at least a first edition identifier associated with at least one column of the first subset of columns of the physical relational database table, and defining the first synonym that points to the first relational database table view of the physical relational database table, wherein the first application edition uses the first synonym to access or manage the first relational database table view of the physical relational database table;

create a second relational database table view for a second application edition of the respective application at least by:

populating the second relational database table view with first modified data from a second subset of columns of the plurality of columns based at least in part upon a second revision identifier associated with the physical relational database table, wherein the second application manages or accesses the second relational database table view, and defining a second synonym that points to the second relational database table view of the physical relational database table, wherein the second application edition uses the second synonym to access or manage the second relational database table view of the physical relational database table, and both the first synonym and the second synonym point to a same physical relational database table;

identify an application definition with an application version identifier that comprises multiple versions of constituent parts of the application definition, the application definition comprising a collection of schema, code, and metadata definitions;

determine a collection of first versioned part definitions for the first application edition of the respective application;

determine a collection of second versioned part definitions for the second application edition of the respective application;

initiate a cutover at least by upgrading or patching the respective application from the first application edition operating upon the first relational database table view to the second application edition operating upon the second relational database table view;

performing an online patch that includes the cutover for the respective application from the respective application run edition to a respective application patch edition of the one or more application editions, wherein performing the online patch comprises:

executing an online patching or upgrading cycle for the respective application at least by identifying a patch or upgrade, and applying the patch or upgrade to the second application edition of the respective application;

identifying continuously changing runtime data for the respective application;

generating one or more additional editions at least by creating a plurality of application code modules and data for repeated applications of transformations to at least a part of the data; and continuing execution of the online patching or upgrading cycle for the respective application at least by continuously applying transformations to the continuously changing runtime data that changes while the online patching or upgrading cycle is executing;

finalizing the online patch of the respective application to the respective application patch edition;

repointing at least one synonym of the physical relational database table to the second synonym associated with the second relational database table view;

setting the second application edition as a new run edition of the respective application;

shutting down the first application edition of the application after the second application edition is finalized for the cutover;

subsequently starting up the new run edition that was set from the second application edition of the respective application, after the first application edition is shut down, such that one or more users accessing the first application edition are offline until the second application edition of the application is started, wherein the first relational database table view and the second relational database table view are generated based on the same underlying data in the physical relational database table;

sync the first subset of columns in the first relational database table view with the second subset of columns in the second relational database table view at least by executing a plurality of triggers, wherein during execution of the plurality of triggers, each trigger of the plurality of triggers populates changes from one subset of the first and second subsets of columns to another subset of the first and second subsets of columns; and cleaning up the first application edition of the respective application.

12. The computer system of claim 11, further comprising program code for configuring a synonym in a first configuration to access a first one of the relational database table views.

13. The computer system of claim 12, further comprising program code for configuring the synonym in a second configuration to access a second one of the relational database table views.

14. The computer system of claim 13, further comprising program code for identifying a set of software applications to be upgraded, then enabling access by at least one of the set of software applications to the first relational database table view using the first configuration, and providing access to the second relational database table view using the second configuration.

15. The computer system of claim 11, wherein creating at least a second relational database table view creates an editioned view using one or more table columns corresponding to a highest revision identifier.

16. The computer system of claim 15, further comprising program code for:
removing constraints on columns that appeared in a first view but do not appear in the editioned view; and
deallocating storage space corresponding to the columns that appeared in a first view but do not appear in the editioned view.

17. The computer system of claim 15, further comprising:
determining an initial file system edition for the physical relational database table, the initial file system edition comprising at least one instance of a running file system and a running file system format for the first application edition of the physical relational database table;
identifying running file system contents for the at least one instance of the running file system, the running file system contents including an application definition and application metadata that control how the application operates;
creating an upgraded file system edition for an upgraded file system that includes upgraded file system contents for upgrading the running file system to the upgraded file system; and
during the cutover, upgrading the initial file system edition to the upgraded file system edition, while upgrading or patching the application from the first application edition to the second application edition.

18. A computer program product embodied in a non-transitory computer readable medium, the computer readable medium having stored thereon a sequence of instructions which, when executed by a processor causes the processor to execute a process to implement using a data dictionary to automatically determine an upgrade edition of a physical relational database table, the process comprising:
identifying a set of applications to be upgraded, wherein the set of applications respectively access a plurality of relational database table views of the physical relational database table;
receiving a data dictionary associated with the set of applications, wherein the data dictionary comprises at least entries pertaining to the physical relational database table, wherein the physical relational database comprises same underlying data in a plurality of columns, and wherein the data dictionary comprises entries that codify data representation of the physical relational database table having the same underlying data in the plurality of columns;
for a respective application of the set of applications, performing a set of acts that comprises:
acquiring, from the data dictionary, respective entries of the physical relational database table corresponding to a respective relational database table view for the respective application; and
based at least in part on the respective entries received from the data dictionary, identifying one or more columns having a corresponding revision identifier, wherein
the one or more columns are associated with the respective application and are accessible by a first synonym that provides an access point to at least one of the physical relational database table, one or more respective application editions, or one or more relational database table views, and
the revision identifier pertains to the one or more changes to be applied to the respective relational database table view associated with a respective application run edition of the respective application;
creating a first relational database table view for a first application edition of the respective application at least by:
populating the first relational database table view with first data from a first subset of columns of the plurality of columns based at least in part upon at least a first edition identifier associated with at least one column of the first subset of columns of the physical relational database table, and
defining the first synonym that points to the first relational database table view of the physical relational database table, wherein the first application edition uses the first synonym to access or manage the first relational database table view of the physical relational database table:
creating a second relational database table view for a second application edition of the respective application at least by:
populating the second relational database table view with first modified data from a second subset of columns of the plurality of columns based at least in part upon a second revision identifier associated with the physical relational database table, wherein the second application manages or accesses the second relational database table view, and
defining a second synonym that points to the second relational database table view of the physical relational database table, wherein the second application edition uses the second synonym to access or manage the second relational database table view of the physical relational database table, and both the first synonym and the second synonym point to a same physical relational database table;
identifying an application definition with an application version identifier that comprises multiple versions of constituent parts of the application definition, the application definition comprising a collection of schema, code, and metadata definitions;
determining a collection of first versioned part definitions for the first application edition of the respective application;
determining a collection of second versioned part definitions for the second application edition of the respective application;

initiating a cutover at least by upgrading or patching the respective application from the first application edition operating upon the first relational database table view to the second application edition operating upon the second relational database table view;

performing an online patch that includes the cutover for the respective application from the respective application run edition to a respective application patch edition of the one or more application editions, wherein performing the online patch comprises:

executing an online patching or upgrading cycle for the respective application at least by identifying a patch or upgrade, and applying the patch or upgrade to the second application edition of the respective application;

identifying continuously changing runtime data for the respective application;

generating one or more additional editions at least by creating a plurality of application code modules and data for repeated applications of transformations to at least a part of the data; and continuing execution of the online patching or upgrading cycle for the respective application at least by continuously applying transformations to the continuously changing runtime data that changes while the online patching or upgrading cycle is executing;

finalizing the online patch of the respective application to the respective application patch edition;

repointing at least one synonym of the physical relational database table to the second synonym associated with the second relational database table view;

setting the second application edition as a new run edition of the respective application;

shutting down the first application edition of the application after the second application edition is finalized for the cutover;

subsequently starting up the new run edition that was set from the second application edition of the respective application, after the first application edition is shut down, such that one or more users accessing the first application edition are offline until the second application edition of the application is started, wherein the first relational database table view and the second relational database table view are generated based on the same underlying data in the physical relational database table;

syncing the first subset of columns in the first relational database table view with the second subset of columns in the second relational database table view at least by executing a plurality of triggers, wherein during execution of the plurality of triggers, each trigger of the plurality of triggers populates changes from one subset of the first and second subsets of columns to another subset of the first and second subsets of columns; and cleaning up the first application edition of the respective application.

19. The computer program product of claim 18, further comprising instructions for configuring a synonym in a first configuration to access a first one of relational database table views.

20. The computer program product of claim 19, further comprising instructions for configuring the synonym in a second configuration to access a second one of the relational database table views.

21. The computer program product of claim 18, wherein creating at least a second relational database table view creates an editioned view using one or more table columns corresponding to a highest revision identifier.

22. The computer program product of claim 21, further comprising:

first program code for removing constraints on columns that appeared in a first view but do not appear in the editioned view; and second program code for deallocating storage space corresponding to the columns that appeared in a first view but do not appear in the editioned view.

23. The computer program product of claim 18, further comprising:

third program code for determining an initial file system edition for the physical relational database table, the initial file system edition comprising at least one instance of a running file system and a running file system format for the first application edition of the physical relational database table;

fourth program code for identifying running file system contents for the at least one instance of the running file system, the running file system contents including an application definition and application metadata that control how the application operates;

fifth program code for creating an upgraded file system edition for an upgraded file system that includes upgraded file system contents for upgrading the running file system to the upgraded file system; and sixth program code for during the cutover, upgrading the initial file system edition to the upgraded file system edition, while upgrading or patching the application from the first application edition to the second application edition.

* * * * *

UNITED STATES PATENT AND TRADEMARK OFFICE
CERTIFICATE OF CORRECTION

PATENT NO. : 10,496,399 B2  
APPLICATION NO. : 13/802771  
DATED : December 3, 2019  
INVENTOR(S) : Buzsaki et al.

Page 1 of 1

It is certified that error appears in the above-identified patent and that said Letters Patent is hereby corrected as shown below:

On the Title Page

On page 3, Column 2, under Other Publications, Line 18, delete "Cororation." and insert -- Corporation. --, therefor.

In the Specification

In Column 16, Line 59, delete "PTSN," and insert -- PSTN, --, therefor.

In the Claims

In Column 26, Line 38, in Claim 18, delete "table:" and insert -- table; --, therefor.

Signed and Sealed this  
Twenty-third Day of February, 2021

Drew Hirshfeld  
*Performing the Functions and Duties of the*  
*Under Secretary of Commerce for Intellectual Property and*  
*Director of the United States Patent and Trademark Office*